United States Patent [19]
Matsuo et al.

[11] Patent Number: 6,131,158
[45] Date of Patent: *Oct. 10, 2000

[54] DATA PROCESSING SYSTEM CAPABLE OF EXECUTING GROUPS OF INSTRUCTIONS, INCLUDING AT LEAST ONE ARITHMETIC INSTRUCTION, IN PARALLEL

[75] Inventors: Masahito Matsuo; Toru Shimizu; Toyohiko Yoshida, all of Itami, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/759,499

[22] Filed: Dec. 4, 1996

Related U.S. Application Data

[62] Division of application No. 08/461,274, Jun. 5, 1995, Pat. No. 5,615,349, which is a continuation of application No. 08/064,727, May 19, 1993, Pat. No. 5,461,715, which is a continuation of application No. 07/577,718, Sep. 4, 1990, abandoned.

[51] Int. Cl.[7] ...................................................... G06F 9/38
[52] U.S. Cl. ........................... 712/244; 712/239; 712/212
[58] Field of Search ..................................... 395/591, 586, 395/388; 712/244, 239, 212

[56] References Cited

U.S. PATENT DOCUMENTS

| | | |
|---|---|---|
| 4,626,989 | 12/1986 | Torii . |
| 4,847,748 | 7/1989 | Yamahata et al. ........................ 395/388 |
| 4,858,105 | 8/1989 | Kuriyama . |
| 4,928,226 | 5/1990 | Kamada . |
| 4,945,511 | 7/1990 | Itomitsu et al. .......................... 395/388 |
| 5,099,421 | 3/1992 | Buerkle . |
| 5,113,503 | 5/1992 | Sasaki et al. ............................ 395/388 |
| 5,148,528 | 9/1992 | Fite . |
| 5,193,156 | 3/1993 | Yoshida et al. ........................... 395/586 |

FOREIGN PATENT DOCUMENTS

| | | |
|---|---|---|
| 57-29153 | 2/1982 | Japan . |
| 63-89932 | 4/1988 | Japan . |
| 1-150935 | 6/1989 | Japan . |

OTHER PUBLICATIONS

Siewioreck, et al., *Computer Structures: Principles and Examples*, pp. 293–302 (Chapter 19).
Okamoto, et al. "Design Consideration for 32–Bit Microprocessor TX3", *Compcon 88, Spring, Digest of Papers*, pp. 25–29.
Kohn, et al. (1989) "A 1,000,000 Transistor Microprocessor", *IEEE ISSCC, Digest of Technical Papers*, pp. 54–55.
H. Schorr (Design principles for a high–performance system) Polytechnic press. pp. 165–174, Apr. 1971.

*Primary Examiner*—Meng-Ai T. An
*Assistant Examiner*—Gautam R. Patel
*Attorney, Agent, or Firm*—Townsend and Townsend and Crew LLP

[57] ABSTRACT

A data processor performs various types of EIT (exception, interrupt, trap) processing in connection with the execution of the preceding and following instructions in parallel. In one embodiment, an exception is detected resulting from processing the previous instruction in the pair being executed in parallel before completion of instruction processing where the exception requires re-execution. When the exception is detected a control means prevents the execution means from executing both preceding and following instructions. An additional feature is a control unit that controls when an interrupt is accepted during parallel execution. In another embodiment, a first decoder outputs suppressing information when the preceding instruction is a predetermined instruction having a possibility of causing a trap. A validity judgment circuit prevents the second decoded result from being issued when suppressing information is generated.

3 Claims, 28 Drawing Sheets

(ADDRESS)

←LOW ADDRESS          HIGH ADDRESS→ ⌐202
←MSB SIDE                 LSB SIDE→

→→DIRECTION OF READ INSTRUCTION→→

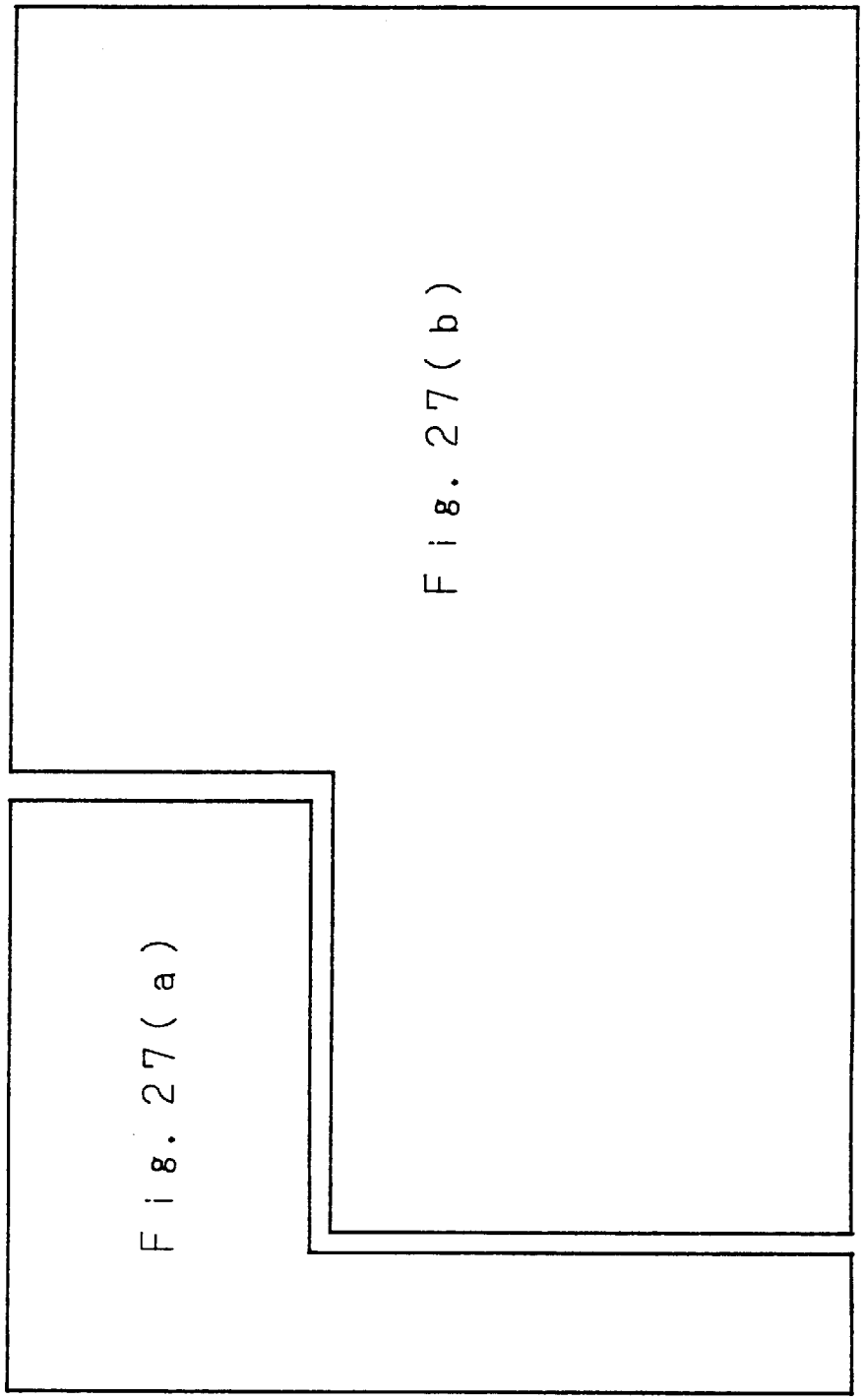

(SERIAL BIT NUMBER)

(ADDRESS)

←LOW ADDRESS                    HIGH ADDRESS→

←→DIRECTION OF READ INSTRUCTION←→

Fig. 33

| SORTING | KIND OF INSTRUCTION | INSTRUCTION | FORMAT |
|---|---|---|---|
| ONE OPERAND INSTRUCTION (REGISTER) | CONPARISION<br>TRANSFER<br>ARITHMETIC OPERATION<br>LOGICAL OPERATION | CMP:Z<br>MOV:Z<br>NEG<br>NOT | G1-format<br>G1-format<br>G1-format<br>G1-format |
| TWO OPERAND INSTRUCTION (REGISTER-REGISTER) | CONPARISION<br>TRANSFER<br>ARITHMETIC OPERATION<br>LOGICAL OPERATION | CMP:L<br>MOV:L,MOV:S<br>ADD:L,SUB:L<br>AND:R,OR:R,XOR:R | L-format<br>L-format,S-format<br>L-format<br>R-format |
| TWO OPERAND INSTRUCTION (LITERAL-REGISTER) | CONPARISION<br>TRANSFER<br>ARITHMETIC OPERATION | CMP:Q<br>MOV:Q<br>ADD:Q,SUB:Q | Q-format<br>Q-format<br>Q-format |
| 1st HALF WORD OF TWO OPERAND INSTRUCTION (REGISTER) | TRANSFER etc. | MOV:G,etc. | G-format |
| 1st HALF WORD OF TWO OPERAND INSTRUCTION (LITERAL) | TRANSFER etc. | MOV:E,etc. | E-format |

SUBCODEV : SUBCODE VALIDITY SIGNAL
REVR     : REGISTER WRITE-IN RESERVATION
           CONTROL SIGNAL
MCODE    : INTERMEDIATE CODE
SREGN    : SOURCE REGISTER NUMBER
DREGN    : DESTINATION REGISTER NUMBER
SIZE     : OPERAND SIZE
LIT      : LITERAL

SUBCODEV: SUBCODE VALIDITY SIGNAL
MCODE    : INTERMEDIATE CODE
SREGN    : SOURCE REGISTER NUMBER
DREGN    : DESTINATION REGISTER NUMBER
SIZE     : OPERAND SIZE
LIT      : LITERAL

Fig. 36

(a)  ADD:Q   #1,R1
     SUB:Q   #1,R2

(b)  MOV:G   @(R0),@(R1)
     ADD:Q   #1,R0

(c)  MUL:R   R2,R0
     ADD:Q   #2,R2

(d)  SHA:Q   #5,R0
     SUB:L   R1,R0

(e)  ADD:Q   #4,@(R1)
     MOV:G   R2,@(R0)

(f)  ADD:Q   #4,R1
     SUB:E   #16,R2

DATA PROCESSING SYSTEM CAPABLE OF EXECUTING GROUPS OF INSTRUCTIONS, INCLUDING AT LEAST ONE ARITHMETIC INSTRUCTION, IN PARALLEL

This is a Division of application Ser. No. 08/461,274, filed Jun. 5, 1995, now U.S. Pat. No. 5,615,349, which is a Continuation of application Ser. No. 08/064,727, filed May 19, 1993, now U.S. Pat. No. 5,461,715, which is a Continuation of application Ser. No. 07/577,718, filed Sep. 4, 1990, abandoned.

BACKGROUND OF THE INVENTION

1. Field of the Invention

The present invention relates to a data processing system realizing a high processing performance by a high parallel processing mechanism, more particularly, it relates to a data processing system capable of executing plural instruction in parallel.

2. Description of the Related Art

FIG. 1 is a block diagram showing a configuration of a typical pipe line processing mechanism of a conventional data processing system.

The pipe line processing mechanism of the data processing system shown in FIG. 1 is constituted by six pipe line stages consisting of an instruction fetch (IF) stage 91 for fetching instruction data, an instruction decoding (D) stage 92 for analyzing instruction data, an address calculation (A) stage 93 for executing operand address calculation, an operand fetch (F) stage 94 for fetching operand data, an execution (E) stage 95 for data processing and an operand writing (W) stage 96 for writing operand data.

In such a pipe line processing mechanism of the conventional data processing system, different instructions can be processed simultaneously in each stage. However, when conflicts occur with respect to the operand access and memory access, processings in the stage with a low priority are interrupted till the conflicts are settled.

As described above, in the data processing system designed for pipe line processing, by dividing the processing into plural stages according to the data processing flow and operating each of the stages simultaneously, a mean processing time necessary for one instruction is shortened to improve the performance as a whole.

An example of data processing system which is made highly efficient by processing the plural instructions simultaneously by the pipe line processing is disclosed in U.S. Pat. No. 4,402,042 "MICROPROCESSOR SYSTEM WITH INSTRUCTION PRE-FETCH".

However, in the data processing system capable of executing up to only one instruction in one machine cycle, the processing performance is restricted by the operating frequency. In order to solve this problem, a plurality of arithmetic units are provided to execute plural instructions in parallel.

For example, in a data processing system called IBM System/360 Model 91, by providing a plurality of adders, multipliers and dividers and adding the function called a "reservation" station" to each of the arithmetic units, the instructions are subjected to passing control to improve the processing speed.

The processing is described particularly in "Computer Structures: Principles and Examples" by Daniel P. Siewiorek, C. Gordon Bell and Allen Newell, McGraw-Hill Book Company, PP. 295–298 (1982).

Also, in a microprocessor MC 88100 by Motorola Inc., by providing a mechanism called "register scoreboarding", conflicts occurred between registers used by a plurality of execution units are detected and a parallel processing sequence is controlled. This is described particularly in "32-bit Microprocessor, Parallel Arithmetic Processings improve Performance", Nikkei Electronics, No. 448, PP. 145 through 149 (1988).

Furthermore, there is also such a case that, by providing an exclusive executing unit for simple arithmetic and logic operation instructions, which is operable independently of usual executing units and having no memory operand, the instructions are passed and controlled. The details are disclosed in "Study on CPU Architecture of a 32-bit Microprocessor TX3 based on TRON Specification" by T. Miyamori et al, Shingaku Technical Review, Vol. 87, No. 422, CPSY 87-53, PP. 31 through 36 (1988).

In a data processing system-called i80860 by Intel Corp. an integer unit, a floating-point adder and a floating-point multiplier are independent and operable simultaneously. When the integer instruction and floating point instruction are in series, the two instructions may be decoded and executed simultaneously. The details are given in "A 1,000, 000 Transistor Microprocessor" by Leslie Kohn and Sai-Wai Fu, ISSCC Digest of Technical Papers, PP. 54 and 55 (1989).

In this way, in the conventional data processing system, the improvement of processing speed is intended by executing the instructions in parallel and controlling the passing of the instructions. However, the detection of a conflict of operands among a plurality of instructions and the execution control including the avoidance of malfunctions are greatly complicated.

In the case where an exception occurs while passing processing of instructions is executed, greatly complicated control is necessary after exceptional processing in order to return the state of the data processing system to the state when the exception was detected and operate the data processing system compatibly.

The conventional data processing system, as aforementioned, has a problem that the execution of a plurality of instructions in parallel makes the execution control greatly complicated and makes the amount of logic for realizing their functions increase largely.

Also a problem occurs that it is very difficult to return the data processing system to the state when the exception was detected after the exceptional processing, in the case where the exception occurs in midway of instruction processing.

SUMMARY OF THE INVENTION

The present invention has been achieved to solve the aforementioned problems. It is an object of the present invention to provide a data processing system capable of executing a plurality of instructions in parallel with simple control.

It is another object of the present invention to provide a data processing system capable of returning correctly from an exceptional processing by the same processing as that in the case of executing instructions one by one without particular control even if an exception occurs in the midway of the instruction processing.

It is a further object of the present invention to provide a data processing system capable of selecting a mode for executing instructions one by one in debugging or a test.

The data processing system of the present invention is constructed so that instruction execution means is provided with a plurality of operation units and has a function of executing a plurality of instructions in parallel, and instruction decoding means comprises means for simultaneously decoding respective instructions in an instruction group composed of a plurality of instructions and detecting means for detecting whether or not the respective instructions are executable by a different operation unit of a plurality of operation units provided in the instruction execution means, respectively without updating operand values referred to by the respective instructions by preceding instruction, so that the instruction execution means executes a plurality of instructions in parallel in the case where the detecting means detects them as executable.

The data processing system of the present invention is also constructed so that the instruction decoding means comprises means for dividing one instruction into one or a plurality of units to be processes so as to decode it and decoding one unit to be processed so as to output one decoded result, and means for simultaneously decoding the last unit to be processed of a first instruction and the unit to be processed of a second instruction in the case where the first instruction is divided into one or a plurality of units to be processed so as to be processed and the second instruction following the first instruction is processed as one unit to be processed, and the instruction execution means comprises means for executing an instruction corresponding to the decoded result of the last unit to be processed of the first instruction and an instruction corresponding to the decoded result of the unit to be processed of the second instruction in parallel.

In addition, the data processing system of the present invention is constructed so that the instruction decoding means comprises means for dividing one instruction into one or a plurality of units to be processed so as to decode it and decoding one unit to be processed so as to output one decoded result, and means for simultaneously decoding the last unit to be processed of the first instruction and the first unit to be processed of the second instruction in the case where the first instruction is divided into one or a plurality of units to be processed so as to be processed and the second instruction following the first instruction is processed as a plurality of units to be processed, and the instruction execution means comprises means for executing an instruction corresponding to the decoded result of the last unit to be processed of the first instruction and an instruction corresponding to the decoded result of the first unit to be processed of the second instruction in parallel.

Furthermore, the data processing system of the present invention adopts the construction capable of selecting whether to execute instructions in parallel or successively in addition to the aforementioned respective constructions.

In the data processing system in accordance with the present invention, the respective instructions can be executed in parallel, in the case where the respective instructions in the instruction group composed of a plurality of instructions are decoded simultaneously, and the respectively preceding instruction does not update each operand value referred to by the respective instructions, respectively while the respective instructions being processable by different operation unit.

Also in the data processing system in accordance with the present invention, in the case where the first instruction is divided into one or a plurality of units to be processed so as to be processed and the second instruction following on the first instruction is processed as one unit to be processed, the instruction decoding means decodes the last unit to be processed of the first instruction and the unit to be processed of the second instruction simultaneously, and the instruction execution means executes the instruction corresponding to the decoded result of the last unit to be processed of the first instruction and the instruction corresponding to the decoded result of the unit to be processed of the second instruction in parallel.

Besides, in the data processing system in accordance with the present invention, in the case where the first instruction is divided into one or a plurality of units to be processed so as to be processed and the second instruction following on the first instruction is processed as a plurality of units to be processed, the instruction decoding means decodes the last unit to be processed of the first instruction and the first unit to be processed of the second instruction simultaneously, and the instruction execution means executes the instruction corresponding to the decoded result of the last unit to be processed of the first instruction and the instruction corresponding to the decoded result of the first unit to be processed of the second instruction in parallel.

Furthermore, in the data processing system of the present invention, it is also possible to select executing the instructions one by one as needed in debugging or a test.

The above and further objects and features of the invention will more fully be apparent from the following detailed description with accompanying drawings.

BRIEF DESCRIPTION OF THE DRAWINGS

FIG. 33 is a table of instructions as decoding objects of a sub decoder of a data processing system of the present invention, FIG. 36 is a schematic view of instruction train for explaining the instruction executing condition by a data processing system of the present invention.

DESCRIPTION OF THE PREFERRED EMBODIMENTS

Hereinafter, detailed description of the present invention is provided based on drawings showing one embodiment thereof.

(1) "Instruction Format and Exception Processing of the Data Processor of the Present Invention"

An instruction of a data processing system of the present invention is formed on a 16-bit unit basis, being variable in length. No instruction with an odd number of bytes is used herein.

The data processing system of the present invention has an instruction format system specifically devised for the purpose of writing highly frequent instructions in a short format. For example, as to a two-operand instruction, two formats are provided; a general format which has basically a configuration of "four bytes+extension part(s)" and allows the utilization of all addressing modes and a short format allowing only the use of a highly frequent instruction and an addressing mode.

FIG. 2 through FIG. 11 are schematic diagrams showing instruction format of the data processing system of the invention.

The meanings of symbols appearing in the instruction format of the data processing system of the present invention shown in FIG. 2 to FIG. 11 are as follows:

- –: Field wherein operation code is put.
- #: Field wherein literal or immediate is put.
- Ea: Field for generating an operand in a general type 8-bit addressing mode.
- Sh: Field for specifying an operand in a short type 6-bit addressing mode.
- Rn: Field for specifying an operand in a register by the register number.

Figure 1:
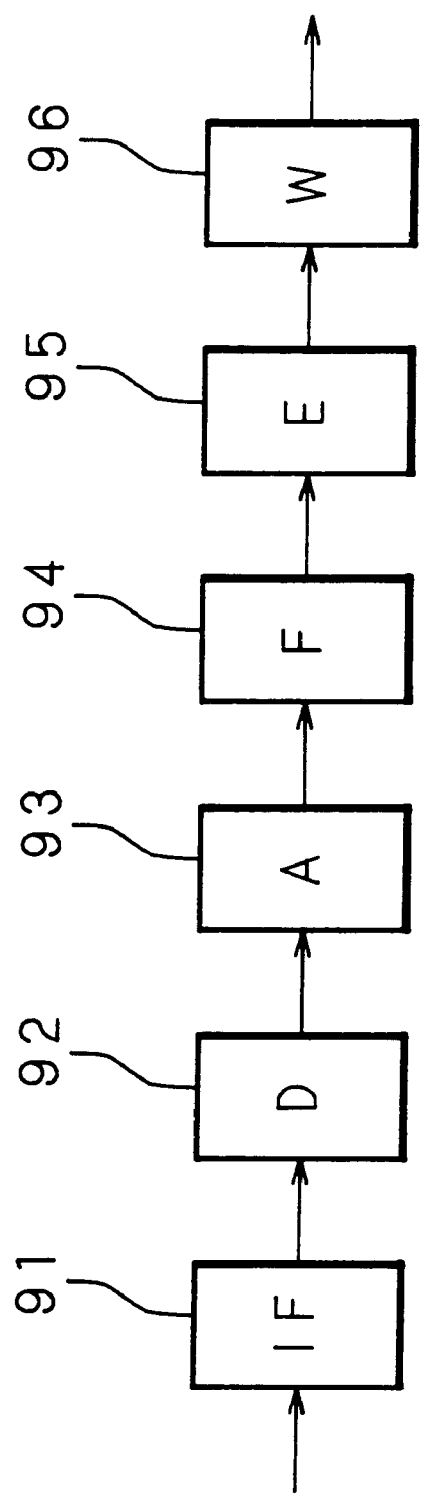
FIG. 1 is a block diagram showing the concept of pipe line processings of a conventional data processing system.
Figure 2:
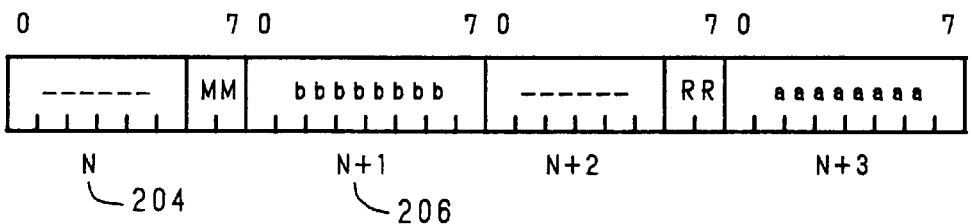
FIG. 2 is a schematic view showing a arrangement of instructions on an instruction memory included in a data processing system of the present invention.

In the format, a s shown in FIG. 2, the right side 202 is the LSB side and is high address. The instruction format can be discriminated only after an address N 204 and an address N+1 206 are checked. As described above, this is because of a premise that the instruction is fetched and decoded on a 16-bit (2-byte) unit basis without fail.

In the data processing system of the present invention, in the case with any format, the extension part of Ea or Sh of each operand is sure to be positioned immediately after a half word comprising the basic part of that Ea or Sh. This takes precedence over the immediate data specified implicitly by the instruction or the extension part of the instruction. Accordingly, as to an instruction of four or more bytes, there are cases where the operation code of the instruction is divided by the extension part of Ea.

Also, as described later, where another extension part is further attached to the extension part of Ea by a chained addressing mode, this part takes precedence over the next operation field. For example, consideration is made on the case of 6-byte instruction which comprises Ea1 in a first half word, Ea2 in a second half word, and ends with a third half word. In the case where the chained addressing mode is used for Ea1, and the Ea2 has an extension part, the actual instruction bit pattern is composed in the sequence of the first half word of instruction (including the basic part of Ea1), the chained addressing mode, the second half word of instruction (including the basic part of Ea2), the extension part of Ea1 and the third half word of instruction.

(1.1) "Short-Format Two-Operand Instruction"

FIG. 3 through FIG. 6 are schematic diagrams showing short formats of the two-operand instruction.

Figure 3:
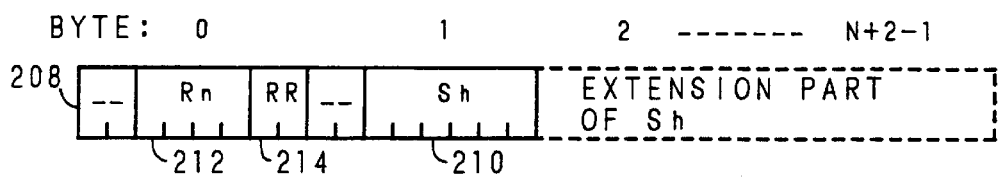
FIG. 3 through FIG. 11 are schematic views showing instruction formats of a data processing system of the present invention.

FIG. 3 is a schematic diagram showing a format 208 of an operational instruction between memory and register. This format includes a L-format wherein the source operand side is a memory and a S-format wherein the destination operand side is a memory.

In the L-format, symbol Sh 210 represents the specifying field of the source operand, symbol Rn 212 represents the specifying field of the register of the destination operand and RR 214 represents specifying of the operand size of Sh 210, respectively. The size of the destination operand located in the register is fixed to 32 bits. Where the size of the resister side differs from that of the memory side and the size of the source side is smaller, sign extension is performed.

In the part of instructions (adding instruction and subtracting instruction), an operand size of source is fixed by a word. In this case, the RR field becomes an operation code.

In the S-format, symbol Sh 210 represents the specifying field of the destination operand, symbol Rn 212 represents the register specifying field of the source operand and RR 214 represents specification of the operand size of Sh 210, respectively. The size of the source operand located in the register is fixed to 32 bits. Where the size of the register side differs from that of the memory side and the size of the source side is larger, truncating of the overflow portion and overflow check are performed.

Figure 4:
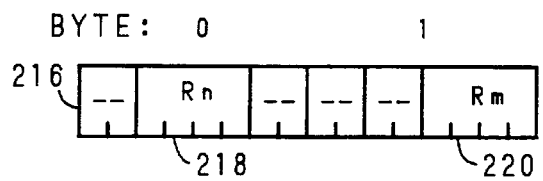

FIG. 4 is a schematic diagram showing a format 216 of an operational instruction between register and register (R-format). Symbol Rn 218 represents the specifying field of the destination register, and symbol Rm 220 represents the specifying field of the source register. The operand seize is 32 bits only.

Figure 5:
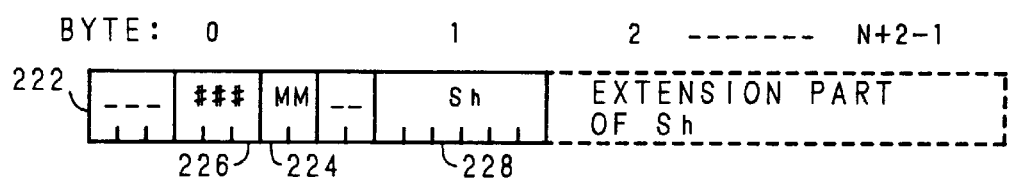

FIG. 5 is a schematic diagram showing a format 222 of an operational instruction between literal and memory (Q-format). Symbol MM 224 represents the specifying field of the destination operand size, symbol ### 226 represents the specifying field of the source operand by literal, and symbol Sh 228 represents the specifying field of the destination operand.

Figure 6:
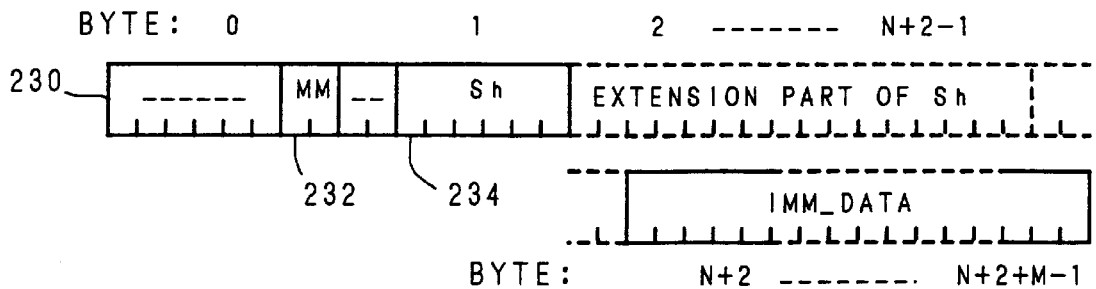

FIG. 6 is a schematic diagram showing a format 230 of an operational instruction between immediate and memory (I-format). Symbol MM 232 represents the specifying field of the destination operand size (common in source and destination), and symbol Sh 234 represents the specifying field of the destination operand. The size of the immediate of the I-format are 8 bits, 16 bits, and 32 bits in common with the sizes of the operand of the destination side, and zero extension and sign extension are not performed.

(1.2) "General-Format One-Operand Instruction"

Figure 7:
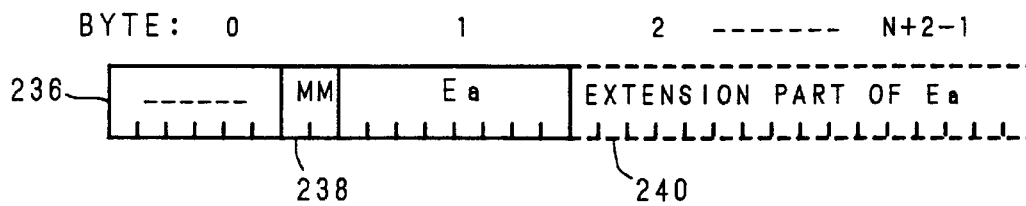

FIG. 7 is a schematic diagram showing a general format 236 of one-operand instruction (G1-format). Symbol MM 238 represents the specifying field of the operand size. Some of the G1-format instructions comprise an extension part besides the extension part of Ea 240. There are also instructions using no MM 238.

(1.3) "General-Format Two-Operand Instruction"

Figure 8:
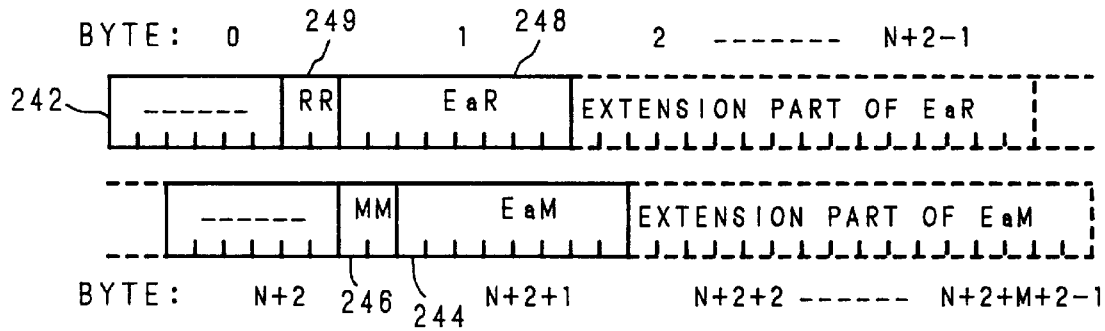
Figure 9:
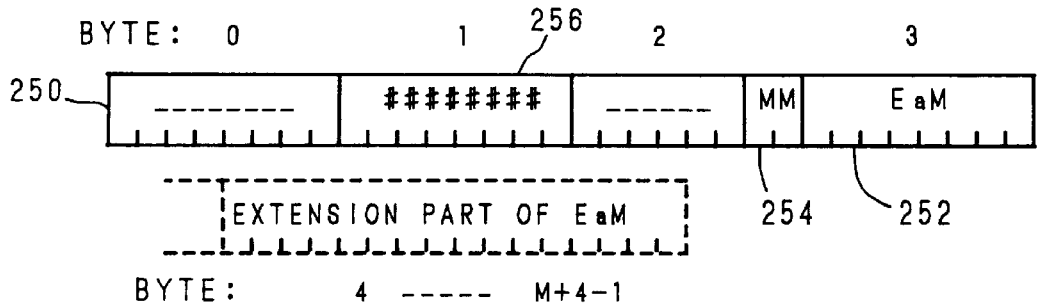
Figure 10:
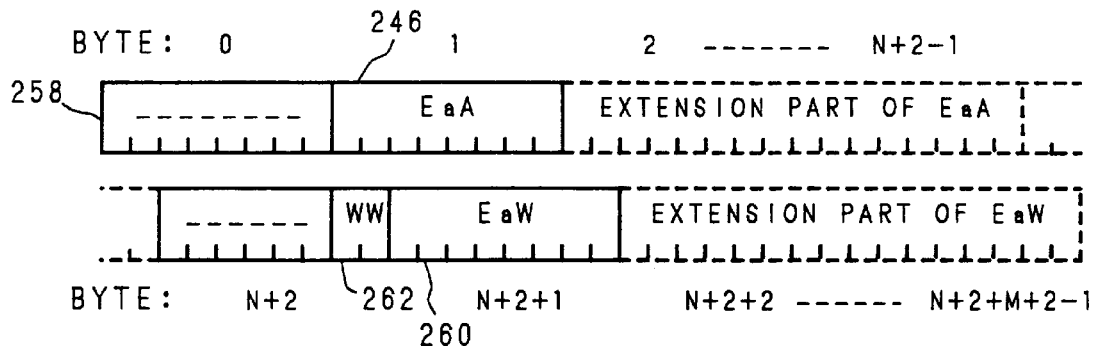

FIG. 8 through FIG. 10 are schematic diagrams showing general formats of two-operand instruction. This format comprises an instruction having a maximum of two operands of the general-type addressing mode which are specified by eight bits. There are cases where the total number of operands becomes three or more.

FIG. 8 is a schematic diagram showing a format 242 of an instruction wherein a first operand necessitates memory read-out (G-format). Symbol EaM 244 represents the specifying field of the destination operand, symbol MM 246 represents the specifying field of the destination operand size, EaR 248 represents the specifying field of the source operand, and RR 249 represents the specifying field of the source operand size.

Some of the G-format instructions comprise an extension part besides the extension part of EaR 248.

FIG. 9 is a schematic diagram showing a format 240 of an instruction wherein a first operand is an instruction of eight-bit immediate (E-format). Symbol EaM 252 represents the specifying field of the destination operand, symbol MM 254 represents the specifying field of the destination operand seize, And symbol ##. . . 256 represents the source operand value.

The E-format and the I-format have similar function, but their conceptions greatly differ from each other, Specifically, the E-format is coherently of a type derived from the general two-operand type (G-format), the size of source operand is eight-bit fixed, and the seize of the destination operand is selected from among 8, 16 and 32 bits. This means that the E-format presupposes an operation between different seizes, and the source operand of eight bits is zero-extended or sign-extended in a manner of agreeing with the size of the destination operand.

On the other hand, the I-format is of a type that the patterns of immediate having high frequency, particularly in transfer instruction and the comparison instruction, are shortened, and the size of the source operand and the destination operand are equal.

FIG. 10 is a schematic diagram showing a format (GA-format) 258 of an instruction wherein a first operand is only an address calculation. Symbol EaW 260 represents the specifying fields of the destination operand, symbol WW 262 represents the specifying fields of the destination operand size, and symbol EaA 264 represents the specifying field of the source operand. For the source operand, the calculation result itself of effective address is used.

Figure 11:
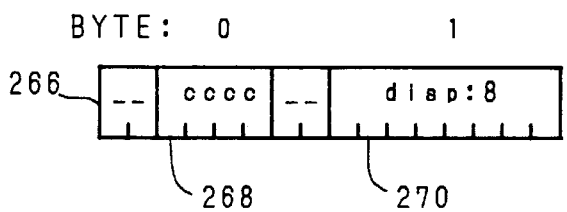

FIG. 11 is a schematic diagram showing a format 266 of a short branch instruction. Symbol cccc 268 represents the specifying field of a branch condition, symbol disp:8 270 represents the specifying field of displacement to a jump destination, and in the data processing system of the present invention, when displacement is specified by eight bits, the displacement value is set by doubling the specified value in the bit pattern.

(1.4) "Addressing Mode"

The methods of specifying the addressing mode of the data processing system of the present invention include the short type specified by six bits including the register and the general type specified by eight bits.

Where an undefined addressing mode has been specified, or where a combination of addressing modes obviously unsuitable has been specified, a reserved instruction exception is generated, likewise, the case where the undefined instruction has been executed, and exceptional processing is started.

Examples of these cases are the case where the destination is the immediate mode and the case where the immediate mode is used in the specifying field of the addressing mode to be accompanied by address calculation.

Meanings of symbols used in the format diagram shown in FIG. 12 to FIG. 22 is as follows:

Rn: Register specification (Sh): Designating method by the short-type addressing mode of six bits (Ea): Designating method by the general-type addressing mode of eight bits In the format diagram, the portion surrounded by a broken line shows the extension part.

(1.4.1) "Basic Addressing Modes"

The data processing system of the present invention supports various addressing modes. Among them, the basic addressing modes supported by the data processing system of the present invention include a register direct mode, a register indirect mode, a register relative indirect mode, an immediate mode, an absolute mode, a Program Counter (PC) relative indirect mode, a stack pop mode and a stack push mode.

Figure 12:
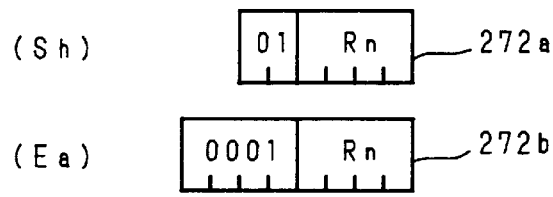
FIG. 12 through FIG. 25 are schematic views for explaining instruction addressing modes of a data processing system of the present invention.

The register direct mode takes the content of a register intact as an operand. FIG. 12 is a schematic diagram of the format thereof. Each symbol Rn 272*a*, 272*b* shows the number of the general-purpose register.

Figure 13:
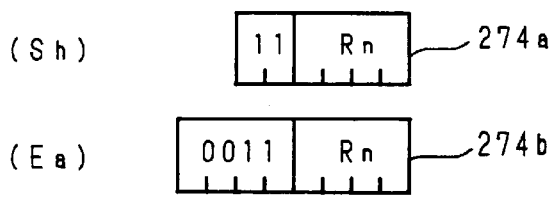

The register indirect mode takes as an operand the content of the memory whose address is the content of a register. FIG. 13 is a schematic diagram of the format thereof. Each symbol Rn 274*a*, 274*b* shows the number of the general-purpose register.

Figure 14:
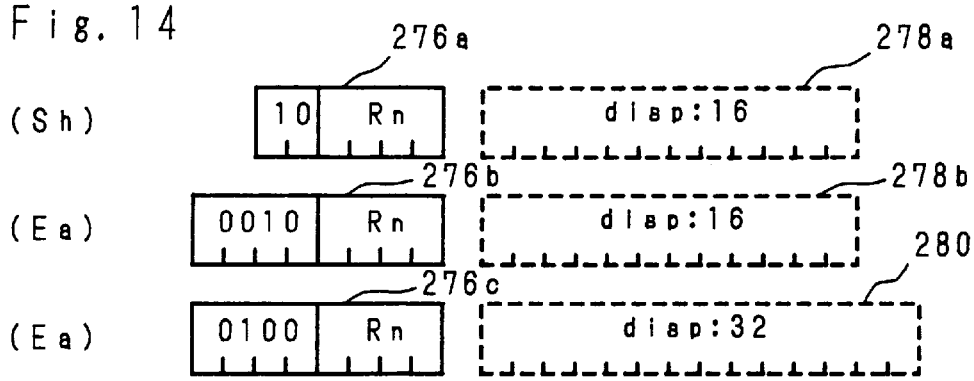

The register relative indirect mode includes two kinds (16 bits and 32 bits) of the displacement value. Each of them takes as an operand the content of the memory whose address is the value of the content of the register added to the displacement value of 16 bits or 32 bits. FIG. 14 is a schematic diagram of the format thereof. Each symbol Rn 276*a*, 276*b*, 276*c* shows the number of the general-purpose register. Each symbol disp:16 278*a*, 278*b* and disp:32 280 shows the displacement value of 16 bits and the displacement value of 32 bits, respectively. The displacement value is handled with a signed binary number.

Figure 15:
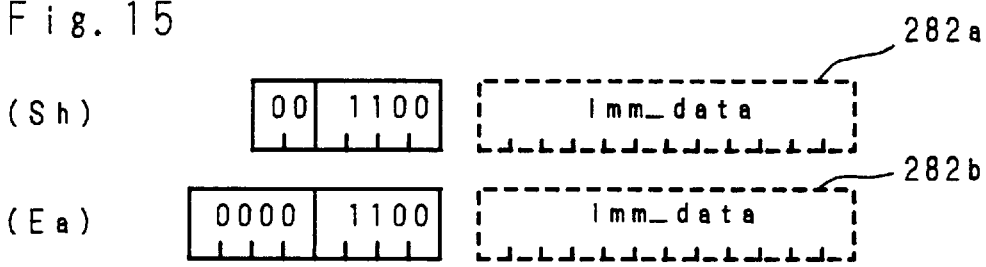

The immediate mode takes as an operand the bit pattern specified in the instruction code while assuming it intact as a binary number. FIG. 15 is a schematic diagram of the format thereof. Each symbol imm_data 282*a*, 282*b* shows the immediate. The size of imm_data is specified in the instruction as the operand size.

Figure 16:
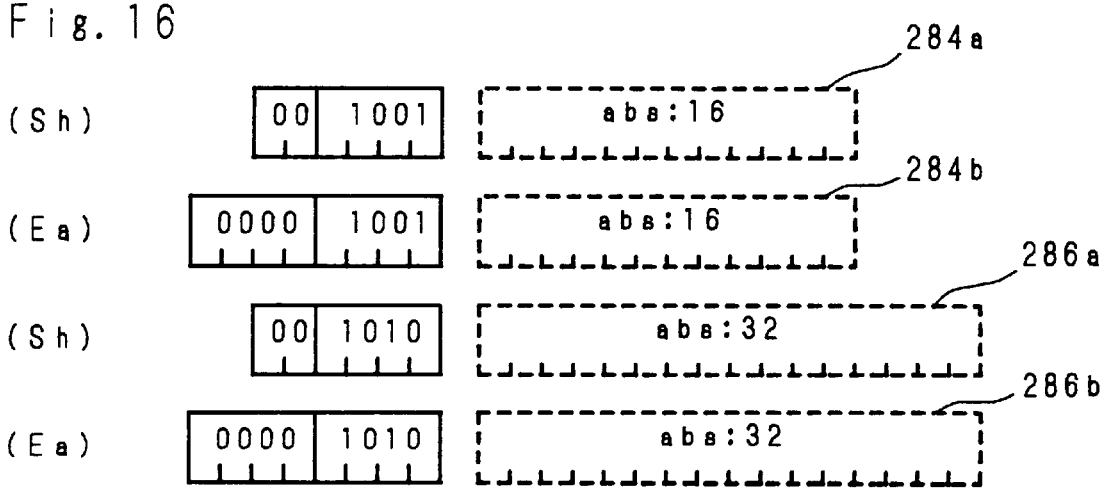

The absolute mode includes two kinds of field (16 bits and 32 bits) for showing the address value. Each kind takes as an operand the content of the memory whose address is the bit pattern of 16 bits or 32 bits specified in the instruction code. FIG. 16 is a schematic diagram showing the format thereof. Each symbol abs:16 284*a*, 284*b* and abs:32 286*a* shows the address value of 16 bits and 32 bits, respectively. When the address is shown by abs:16, the specified address value is sign-extended to 32 bits.

Figure 17:
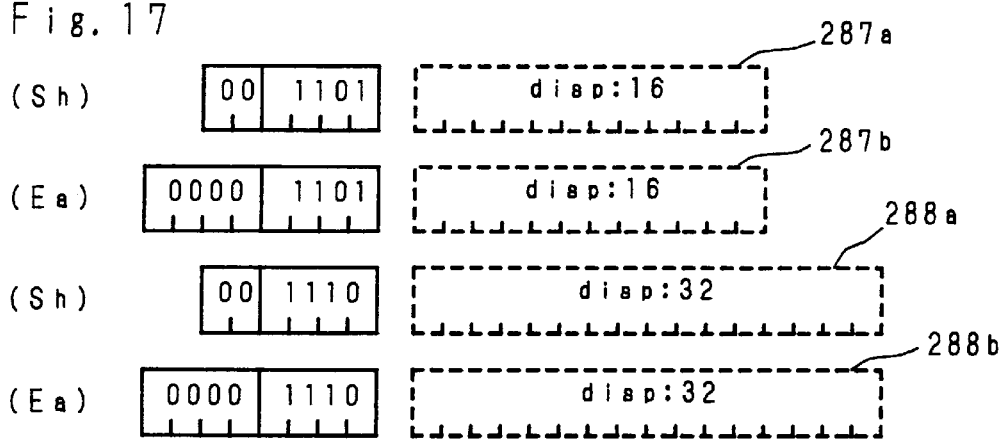

The PC relative indirect mode includes two kinds of field (16 bits and 32) for bits of the displacement value. Each takes as an operand the content of the memory whose address is the value of the content of a program counter whereto the displacement value of 16 bits or 32 bits is added. FIG. 17 is a schematic diagram showing the format thereof. Each symbol disp:16 286*a*, 286*b* and disp:32 288*a*, 288*b* shows the displacement value of 16 bits and the displacement value of 32 bits, respectively. The displacement value is handled with a signed binary number. In the PC relative indirect mode, the value of the program counter to be referred is the start address of the instruction comprising the operand. Where the value of the program counter is referred in the chained addressing mode, the start address of the instruction is also used as a reference value of PC relativity.

Figure 18:
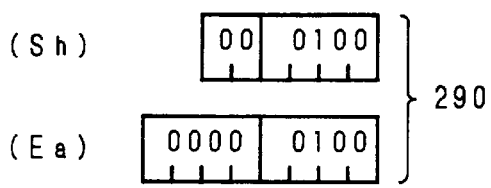

The stack pop mode takes as an operand the content of the memory whose address is the content of a stack pointer (SP). After operand access, the SP is incremented by the operand size. For example, where 32-bit data is handled, the SP is renewed (incremented) by +4 after the operand access. Designating of the stack pop mode for operands of sizes of B and H can also be performed, and the SP is renewed (incremented) by +1 and +2, respectively. FIG. 18 is a schematic diagram of the format thereof. As to the one wherein the stack pop mode is invalid for the operand, a reserved instruction exception is generated. Specifically, the stack pop mode specifying for a write operand and a read-modify-write operand becomes the reserved instruction exception.

Figure 19:
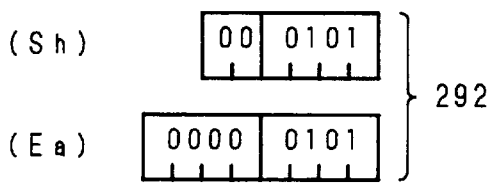

The stack push mode takes as an operand the content of the memory whose address is the content of the SP decremented by the operand size. In the stack push mode, the SP is decremented before operand access. For example, when handling 32-bit data, the SP is renewed (decremented) by −4 before operand access. It is also possible to specify the stack push mode for operands of sizes of B and H, and the SP is renewed (decremented) by −1 and −2, respectively. FIG. 19 is a schematic diagram showing the format thereof. As to the one wherein the stack push mode is invalid for the operand, a reserved instruction exception is generated. Specifically, the stack push mode specifying a read operand and a read-modify-write operand becomes the reserved instruction exceptions.

(1.4.2) "Chained Addressing Mode"

Addressing, whatever complicated, can basically be decomposed into combinations of addition and indirect reference. Accordingly, operations of addition and indirect reference are given in advance as primitives of addressing, and in the case where they can be combined arbitrarily, any complicated addressing mode can be realized.

The chained addressing mode of the data processing system of the present invention is an addressing mode based on such a conception. A complicated addressing mode is particularly useful for data reference between modules or the processing system of AI (Artificial Intelligence) language.

When specifying the chained addressing mode, in the basic addressing mode specifying field, one is specified from among three kinds of specifying methods viz. a register base chained addressing mode, a PC base chained addressing mode and an absolute chained addressing mode.

Figure 20:
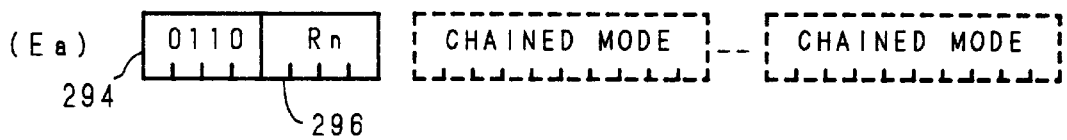

The register base chained addressing mode is an addressing mode taking the value of register as the base value of the chained addressing to be extended. FIG. 20 is a schematic diagram showing the format 294 thereof. Symbol Rn 296 shows the number of the general-purpose register.

Figure 21:
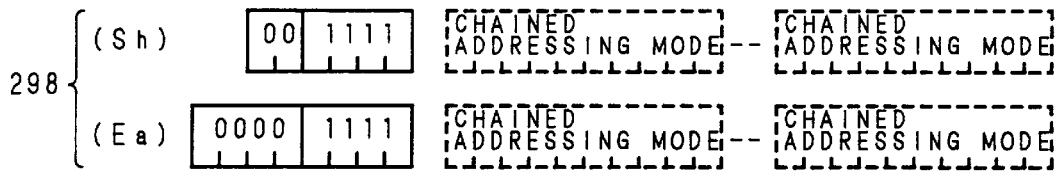

The PC base chained addressing mode is an addressing mode taking the value of the program counter (PC) as the base value of the chained addressing to be extended. FIG. 21 is a schematic diagram showing the format 298 thereof.

Figure 22:
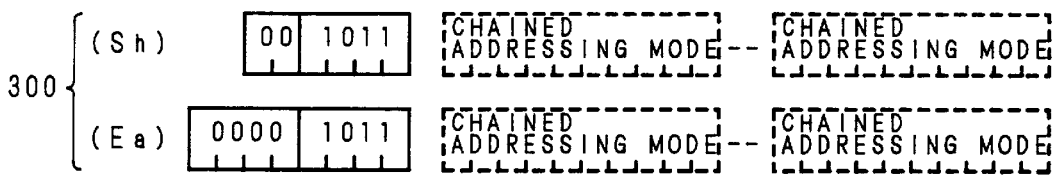

The absolute base chained addressing mode is an addressing mode taking zero as the base value of the chained addressing to be extended. FIG. 22 is a schematic diagram of the format 300 thereof.

Figure 23:
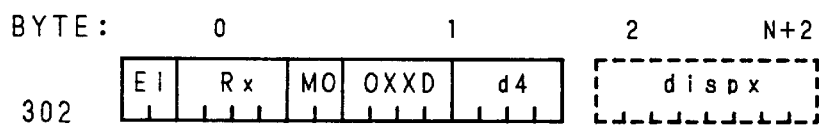

The chained addressing mode specifying field to be extended takes 16 bits as a unit, and this is repeated number of times. In each stage of the chained addressing mode, addition of displacement, scaling (x1, x2, x4, x8) and addition of an index register, and indirect reference of memory are performed. FIG. 23 is a schematic diagram showing the format 302 of the chained addressing mode. Each field has meanings as shown below.

E=0: Chained addressing mode is continued.

E=1: Address calculation ends. tmp==>address of operand

I=0: No memory indirect reference is performed. tmp+disp+Rx * Scale==>tmp

I=1: Memory indirect reference is performed. mem [tmp+disp+Rx * Scale]==>tmp

M=0: <Rx> is used as an index.

M=1: Special index
    <Rx>=0 Index value is not added (Rx=0).
    <Rx>=1 Program counter is used as an index value (Rx=PC).
    <Rx>=2 or more Reserved.

D=0: The value of field d4 of four bits in the chained addressing mode is quadrupled to be taken as a displacement value, and this value is added. The d4 is handled with a signed binary number, and is used by surely quadrupling it irrespective of the size of the operand.

D=1: The dispx (16/32 bits) specified in the extension part of the chained addressing mode is taken as a displacement value, the size of the extension part whereto this value is added is specified in the d4 field.

| d4 = 0001 | dispx: 16 bits |
|---|---|
| d4 = 0010 | dispx: 32 bits |

XX: Index scale (scale=1/2/4/8)

Where scaling of x2, x4, x8 has been performed for the program counter, an indefinite value is entered as an intermediate value (tmp) after completion of processing of that stage. The effective address obtained by this chained addressing mode becomes an unpredictable value, but no exception is generated. Designating of scaling for the program counter should not be performed.

Figure 24:
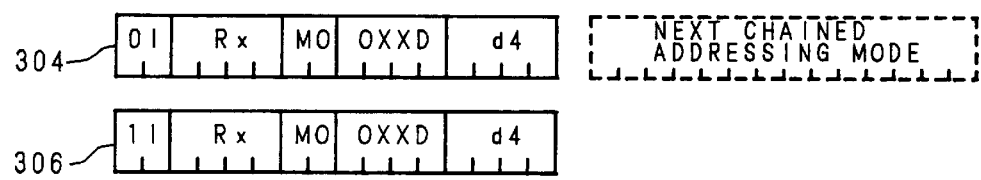
Figure 25:
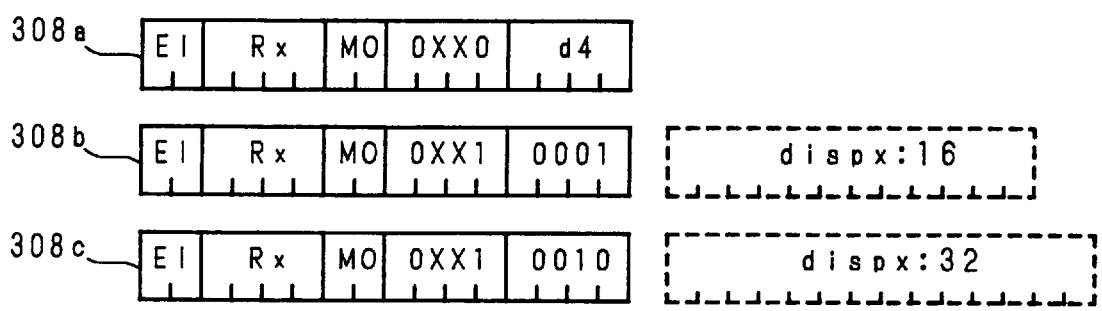

FIG. 24 and FIG. 25 show variations on the instruction format formed by the chained addressing mode.

FIG. 24 shows variations of continuation 304 and completion of the chained addressing mode.

FIG. 25 shows variations 308a, 308b, 308c on the size of displacement.

In the case where the chained addressing mode of an arbitrary number of stages can be utilized, case-sorting in the compiler, based on the number of stage, can be dispensed with, and therefore an advantage of alleviating the burden on the compiler is obtainable. This is because, even if frequency of chained reference is very low, the compiler has to be able to generate a correct code without fail. For this reason, up to an arbitrary number of stages can be applied in the format.

(1.5) "Exception Processing"

The data processing system of the present invention has abundant exceptional processing functions for alleviating software load.

in the data processing system of the invention, there are three kinds of the exceptional processing which are reexecution of instruction processing (named exception), completion of instruction processing (named trap) and interruption. In the data processing system of the invention, these three kinds of the exceptional processings and system faults are generally called EIT.

The exception includes a reserved instruction exception which is generated in the case where an undefined bit pattern is specified in an instruction code, a reserved function exception which is generated in the case where an undefined function is used by other than a bit pattern, an illegal operand exception which is generated in the case where an incorrect operand value is specified, a privileged instruction exception which generated in the case where an instruction as the privilege instruction is used from a user mode, a bus access exception which is generated in the case where a bus error occurs at a memory access, an address translation exception which is generated in the case where violation of memory protect occurs at a memory access, and the like.

The trap includes a zero divide trap which is generated in the case where a divisor is zero in a division instruction, a self debug trap which is generated in the case where a debug event is detected at the preset PC break point or operand break point for debug support, a trap instruction which generates a trap by software, a conditional trap instruction, a bus access error is detected at store buffer processing, an address translation trap which is detected in the case where a violation of memory protect is detected at store buffer processing, an odd address jump trap which is generated in the case where jump is executed to an odd address, and the like.

The interruption includes an external interruption generated by an external hardware signal and a delay interruption generated by software. The interruption is accepted at a interval of instructions (at the end of one instruction) by hardware regardless of a context which is under operation.

(2) "Configuration of Function Block"

Figure 26:
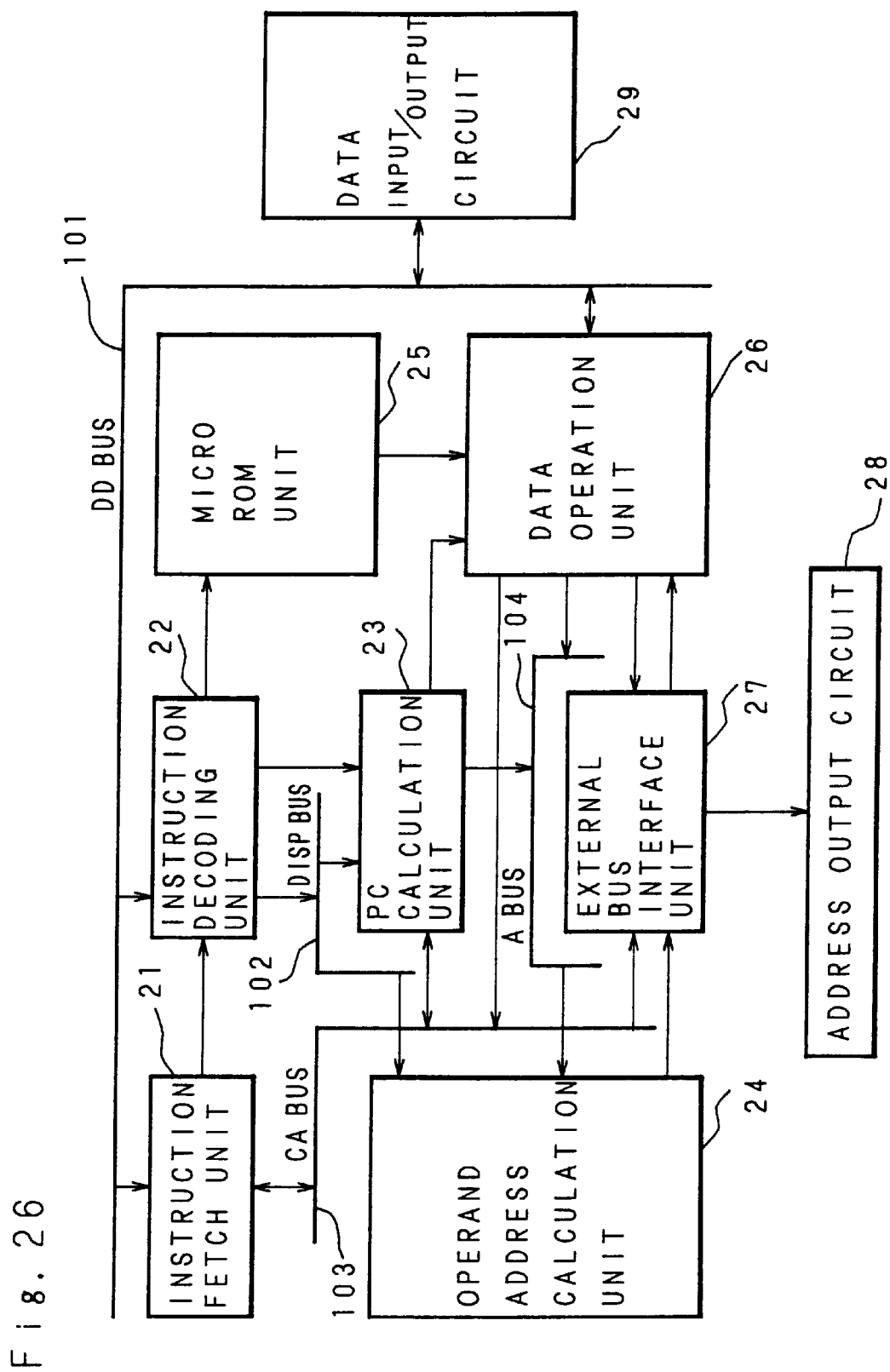
FIG. 26 is a block diagram showing an entire configuration of a data processing system of the present invention.

FIG. 26 is a block diagram showing a configuration of the data processing system of the present invention.

Figure 27A:
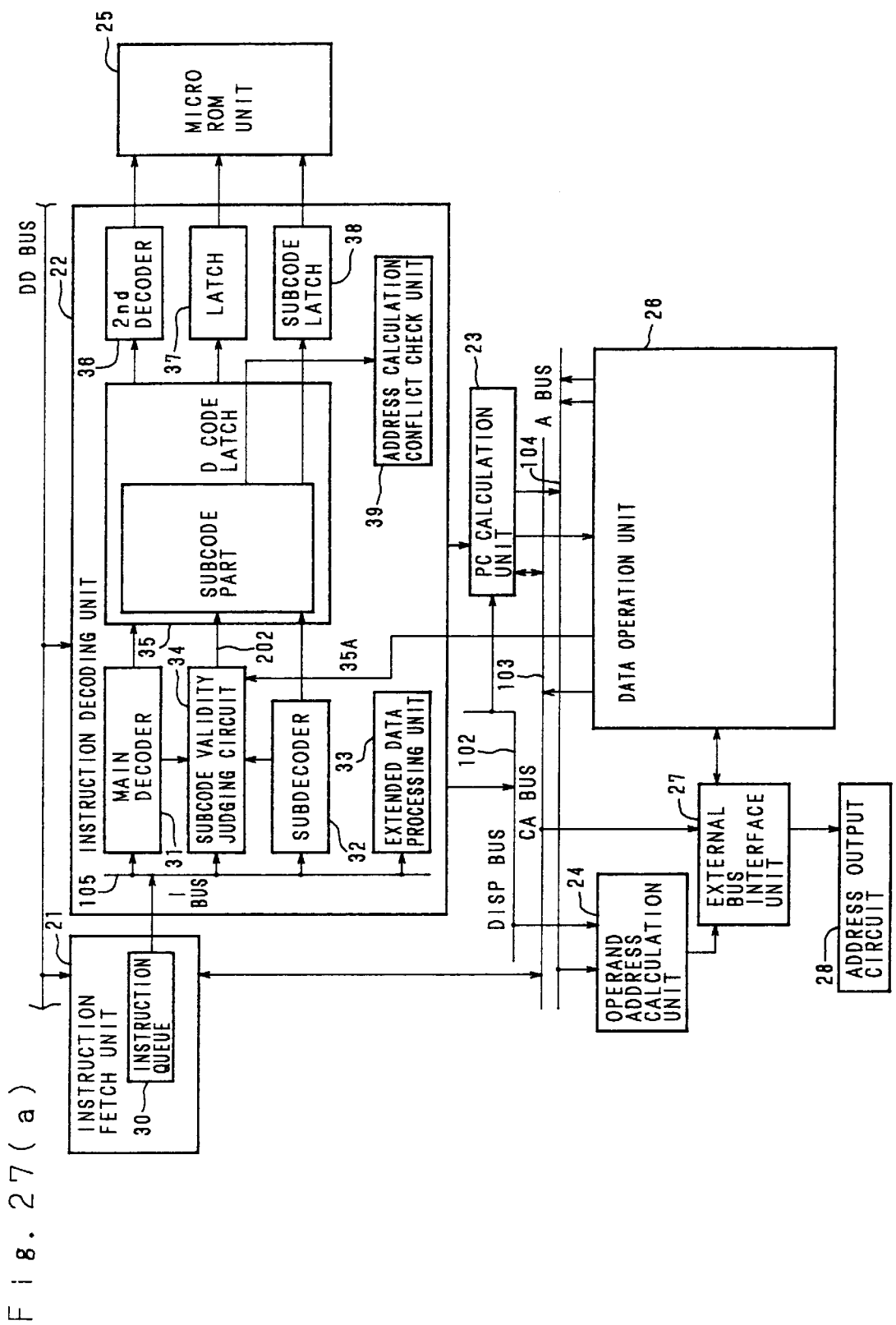
FIG. 27 is a block diagram showing a detailed configuration of a data processing system of the present invention.
Figure 27B:
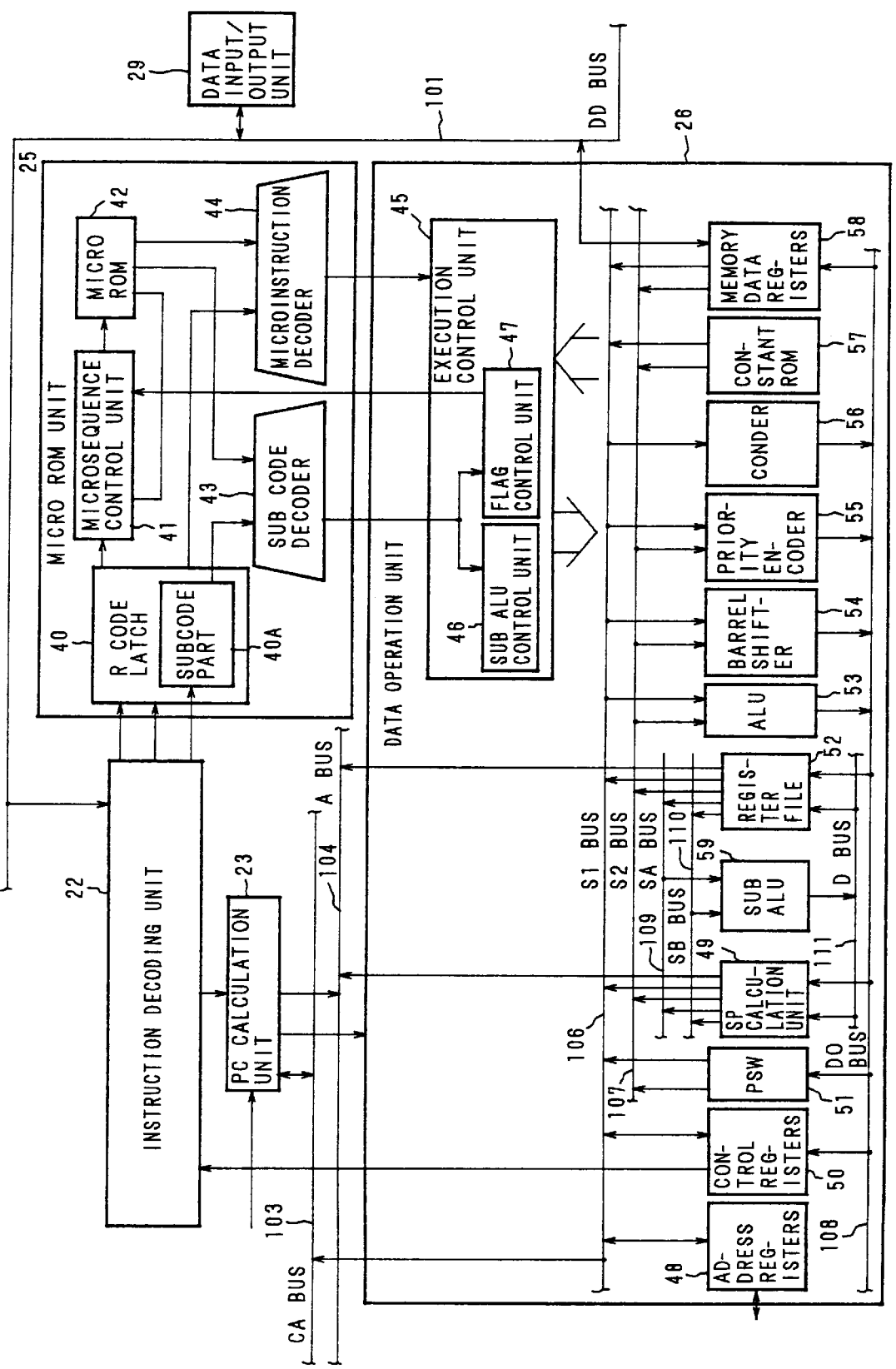

FIG. 27 is a block diagram showing detailed configuration thereof.

The interior of the data processing system of the present invention is functionally divided roughly into an instruction fetch unit 21, an instruction decoding unit 22, a PC calculation unit 23, an operand address calculation unit 24, a micro ROM unit 25, a data operation unit 26 and an external bus interface unit 27.

In FIG. 25, in addition to the above-described units, an address output circuit 28 for outputting address to the exterior of a CPU and a data input/output circuit 29 for inputting and outputting data from and to the exterior of the CPU are shown being separated from the other function block units.

In addition, reference numerals 101 through 111 are internal buses for transferring data and address.

(2.1) "Instruction Fetch Unit"

The instruction fetch unit 21 which comprises a branch buffer, an instruction queue 30 and a controlling unit thereof, determines the address of an instruction to be fetched next and fetches the instruction from the branch buffer or a memory outside the CPU. It also performs instruction registering to the branch buffer.

The branch buffer is small-scaled, therefore operating as a selective cache.

Detailed description on the operation of the branch buffer is disclosed in the Japanese Patent Application Laid-Open No. 63-56731 (1988) (incorporated herein by reference).

The address of an instruction to be fetched next is calculated by a dedicated counter as the address of the instruction to be inputted to an instruction queue 30. In the case where a branch or jump is generated, an address of a new instruction is transferred from the PC calculation unit 23 or the data operation unit 26.

In the case where an instruction is fetched from a memory outside the CPU, the address of the instruction to be fetched is outputted from the address output circuit 28 to the outside of the CPU through a CA bus 103 and the external bus interface unit 27, and an instruction code is fetched from the data input/output circuit 29. Then, among the instruction codes in buffering, the instruction code to be decoded next is outputted to the instruction decoding unit 22.

(2.2) "Instruction Decoding Unit"

In the instruction decoding unit 22, basically an instruction code is decoded on a 16-bit (half word) basis. The instruction code fetched from the instruction fetch unit 21 to this instruction decoding unit 22 is sent to each block through an I bus 105.

The instruction decoding unit 22 comprises three decoders such as a main decoder 31 for instruction decoding of the first step, a subdecoder 32 for decoding only limited instructions in order to execute two instructions in parallel, and a second decoder 36 for decoding the output of the main decoder 31 in order to generate an entry address of the micro ROM.

Also, the main decoder 31 comprises a FHW decoder for decoding an operation code included in the first half word, a NFHW (not first half word) decoder for decoding an operation code including in the second and the third half words, and an addressing mode decoder for decoding an addressing mode. These main decoder 31 and the subdecoder 32 are generally called the first stage decoder.

There are also the second stage decoder which further decodes an output of the FHW decoder and the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 22 decodes the instruction code being inputted from the instruction fetch unit 21 by 0 bytes through 6 bytes bytes per two clocks. In the case where two instructions are executed in parallel, maximum two of instructions are simultaneously decoded. Among the results of decoding, information on operation in the data operation unit 26 is outputted to the micro ROM unit 25, information on operand address calculation is outputted to the operand address calculation unit 24, and information on PC calculation is outputted to the PC calculation unit 23, and information on control of output pointer of the instruction queue 30 and the like are outputted to the instruction fetch unit 21, respectively.

(2.3) "Micro ROM Unit"

The micro ROM unit 25 comprises a micro ROM 42 for storing microprograms which mainly controls the data operation unit 26, a micro sequence control unit 41, and a micro instruction decoder 44, a subcode decoder 43 which, in the case where two instructions are executed in parallel, decodes an instruction of later side by hardwired, and an R-code latch 40 which temporarily holds values of signal group fetched from the instruction decoding unit 22.

A micro instruction is read out from the micro ROM once per two clocks. The micro sequence control unit 41 accepts processings of exception, interruption and trap (these three are generally called EIT) in a hardware manner in addition to the sequential processings shown by the microprograms.

To the micro ROM unit 25, there are inputted flag information generated by interruption independent of the instruction code or by the result of operation execution, and output of an instruction decoding unit 22 such as output of a second stage decoder 36.

Output of the micro decoder is mainly given to the data operation unit 26, but some information such as information of stopping other preceding processing due to execution of a jump instruction is outputted also to other blocks.

(2.4) "Operand Address Calculation Unit"

The operand address calculation unit 24 is controlled in a hardwired manner by information on operand address calculation outputted from the addressing mode decoder of the instruction decoding unit 22 or the like. In this operand address calculation unit 24, substantially all processing on operand address calculations is performed. Checking is conducted to determined whether or not the address of memory access for memory indirect addressing and the operand address can be within an I/O area mapped in the memory.

The result of address calculation is sent to the external bus interface unit 27. The values of the general-purpose register and the program counter required for address calculation are inputted from the data operation unit 26 and the PC calculation unit 23 through an A bus 104.

In performing the memory indirect addressing, the memory address to be referred is outputted from the address output circuit 28 to the outside of the CPU through the external bus interface unit 27, and the indirect address value inputted from the data input/output unit 29 is fetched through an DD bus 101, the instruction decoding unit 22 and a DISP bus 102.

(2.5) "PC Calculation Unit"

The PC calculation unit 23 is controlled in a hardwired manner using information on PC calculation outputted from the instruction decoding unit 22. The PC calculation unit 23 calculates the PC value of an instruction.

The data processing system of the present invention has a variable-length instruction set, and the length of that instruction can be found only after the instruction is decoded. For this reason, the PC calculation unit 23 generates the PC value of the next instruction by adding the length of the instruction outputted from the instruction decoding unit 22 to the PC value of the instruction in decoding.

In the case where the instruction decoding unit 22 decodes a branch instruction and directs a branch in the decoding stage, the PC value of a branch destination instruction is calculated by adding a branch displacement in place of the instruction length to the PC value of the branch instruction. In the data processing system of the present invention, performing a branch in the instruction decoding stage in response to the branch instruction is called pre-branch.

A detailed description of this prebranch approach is disclosed in Japanese Patent Application Laid-Open No. 63-59630 (1988) and Japanese Patent Application Laid-Open No. 63-55639 (1988) (incorporated herein by reference).

The result of calculation in the PC calculation unit 23 is outputted as the PC value of each instruction together with the result of decoding of the instruction, and in addition, is outputted to the instruction fetch unit 21 as the address of the instruction to be decoded next at pre-branch. Also, it is used for the address for branch prediction of the instruction to be decoded next in the instruction decoding unit 22.

A detailed description of the branch prediction approaches is disclosed in Japanese Patent Application Laid-Open No. 63-175934 (1988) (incorporated herein by reference).

(2.6) "Data Operation Unit"

The data operation unit 26 is controlled by an execution control unit 45, and executes the operation required for realizing the function of each instruction by means of registers and an arithmetic unit according to output information of the micro ROM unit 25.

The execution control unit 45 also controls memory accessing necessary for executing instruction.

In the case where the operand to be operated by an instruction is an address or an immediate, the address calculated in the operand address calculation unit 24 is obtained by passing it through the external bus interface unit 27 to the address registers 48.

In the case where the operand to be operated on is in a memory outside the CPU, the external bus interface unit 27 outputs the address calculated in the address calculation unit 24 from the address output circuit 28, and the operand fetched from the memory outside the CPU is obtained to the memory data registers 58 from the data input/output circuit 29 through the DD bus 101.

Arithmetic units include an ALU 53, a barrel shifter 54, a priority encoder 55, a counter 56, an SP calculation unit 49 controlling increment/decrement of the stack pointer, and a shift register.

The register file 52 including a general purpose register and working register, the SP calculation unit 49 and main arithmetic unit are connected through three buses such as an S1 bus 106, an S2 bus 107 and a D0 bus 108. One microinstruction which directs one register-register operation is processed per two clocks cycle.

The sub ALU 59 is also provided. The sub ALU 59 can operate independent from the main ALU 53 in order to two instruction can be executed in parallel. The sub ALU 59 is controlled with the register file 52 and the SP calculation unit 49 through the three exclusive buses such as the SA bus 109, SB bus 110 and D bus 111.

Moreover, a constant ROM 57, processor status word (PSW) 51 which is comprised of field for controlling status of the processor, flag for reflecting executed result, and the like, a control registers 50 which executes various controls with respect to the data processing system, an address registers 48 which stores address for memory access and be able to make the address increment/decrement, a memory data registers 58 for storing data which is fetched from the memory and data which is written in the memory, and the like.

In the case where an access to the memory outside the CPU is required at the data operation, the address stored in address registers 48 is outputted from the address output circuit 28 to the outside of the CPU through the external bus interface unit 27 under the control of the execution control unit 45, and the target data is fetched to the memory data group 58 through the data input/output circuit 29 and the DD bus 101.

In the case where data is stored in the memory outside the CPU, the address stored in the address data registers 48 is outputted from the address output circuit 28 through the external bus interface unit 27, and simultaneously the data stored in the memory data registers 58 is outputted from the data input/output circuit 29 through the DD bus 101 to the outside of the CPU.

In order to efficiently perform an operand store, a four-byte store buffer is installed in the data operation unit 26.

In the case where the data operation unit 26 obtains a new instruction address by processing a jump instruction or an exceptional processing, this is outputted to the instruction fetch unit 21 and the PC calculation unit 23.

(2.7) "External Bus Interface Unit"

The external bus interface unit 27 controls communication through the external bus of the data processing system of the present invention. All accesses to memories are performed in a clock-synchronized manner, and can be performed in a minimum of two clocks cycle.

Access requests to memory are generated independently from the instruction fetch unit 21, the operand address calculation unit 24 and the data operation unit 26.

The external bus interface unit 27 arbitrates these memory access requests. Furthermore, access to data located at misaligned words, i.e., memory address which involve crossing over the word boundary of 32 bits (one word) which is the size of the data bus connecting the memory to the CPU is performed in a manner that crossing over the word boundary is automatically detected in this block and the access is decomposed into memory accesses over two steps.

This unit 27 also performs conflict preventing processing and by-pass processing from the store operand to the fetch operand in the case where the operand to be pre-fetched and the operand to be stored are superposed.

(3) "Pipeline Processing"

The data processing system of the invention is provided with two execution modes. One mode is a sequential execution mode under which instructions are processed in the data operation unit 26 one by one. Other mode is a parallel execution mode under which two instructions are executed in parallel in the data operation unit 26.

In the following, the pipeline processing technique including operation under the parallel execution mode is described.

(3.1) "Clock"

Figure 28:
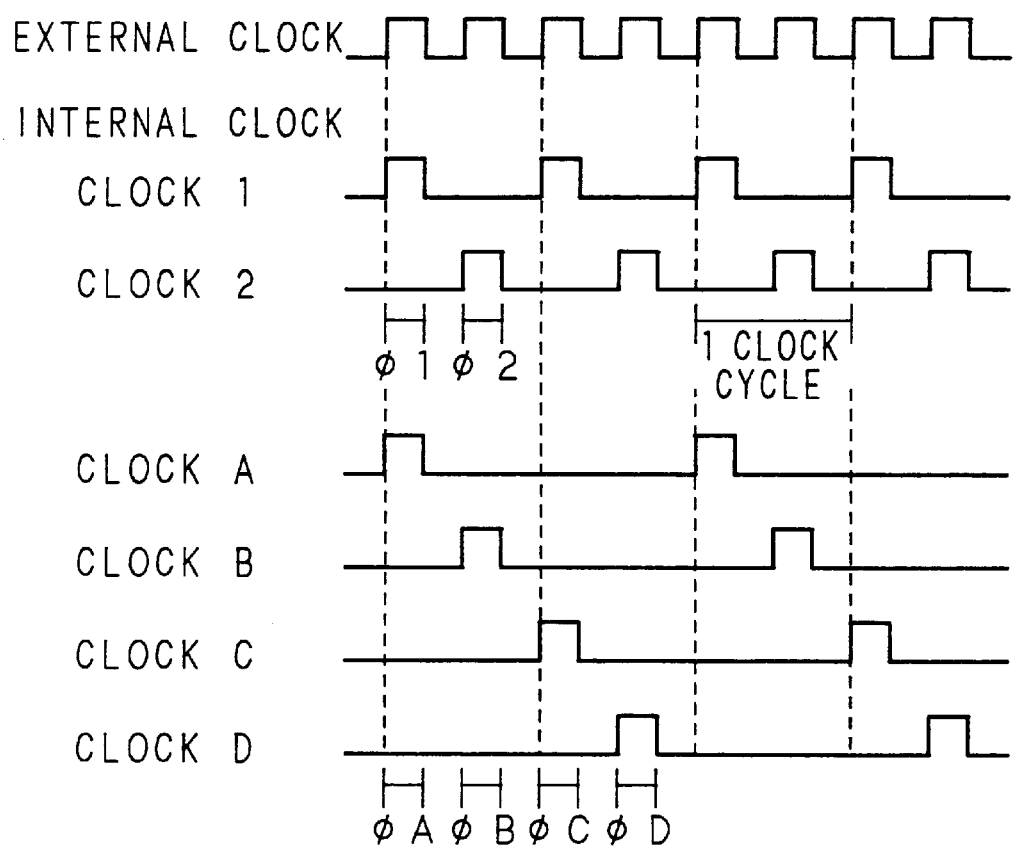
FIG. 28 is a timing chart showing a clock timing of a data processing system of the present invention.

FIG. 28 is a timing chart of a clock of the data processing system of the invention.

In the data processing system of the invention, single phase clock is inputted from exterior, and it is divided into ½ in order to generate a non-overlapped two phase clock (Clock 1 and Clock 2). The non-overlapped two phase clock is fed to whole of data processing system.

Each pipeline stage is logically regulated their basic operation by a non-overlapped 4-phase clock (Clock A, Clock B, Clock C and Clock D) which is generated by logical product of abovementioned non-overlapped two phase clock and the control Accordingly, each pipeline stage can execute one processing per two clocks cycle in minimum.

Hereinafter, state of high level of the Clock 1, Clock 2, Clock A, Clock B, Clock C and Clock D is called $\phi 1$, $\phi 2$, $\phi A1$, $\phi B$, $\phi C$ and $\phi D$, respectively.

(3.2) "Pipeline Processing Mechanism"

Figure 29:
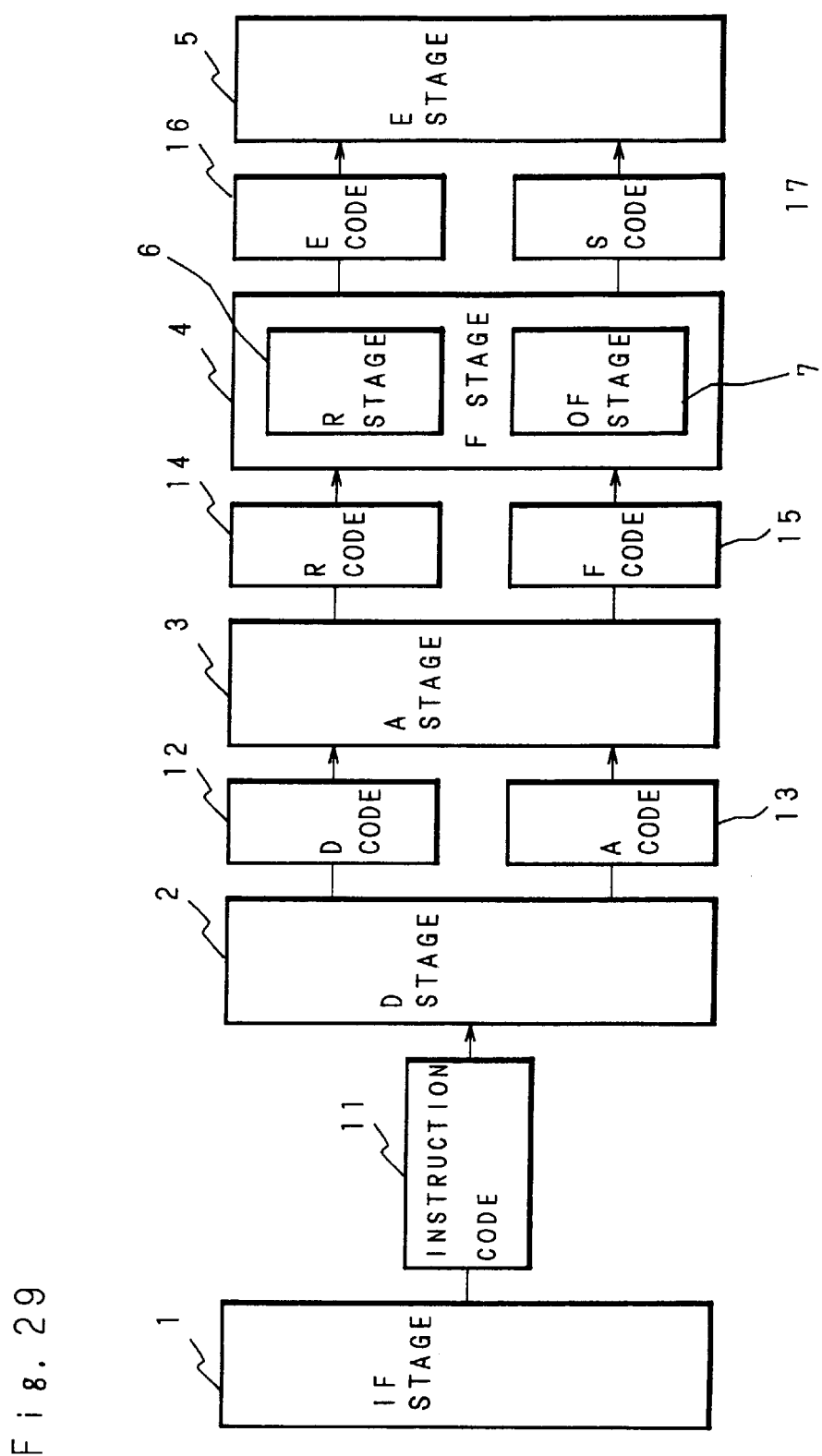
FIG. 29 is a block diagram showing a configuration of a pipe line processing mechanism of a data processing system of the present invention.

FIG. 29 is a schematic diagram showing a pipeline processing mechanism of the data processing system of the present invention.

The basis of pipeline processing has a five-stage configuration which comprises an instruction fetch stage (IF stage) 1 for prefetching an instruction, a decoding stage (D stage) 2 for decoding the instruction, an operand address calculation stage (A stage) 3 for performing address calculation of an operand, an operand fetch stage (F stage) 4 consisting of a portion for performing micro ROM access (particularly called an R stage 6) and a portion for pre-fetch an operand (particularly called an OF stage 7), and an execution stage (E stage) 5 for executing an instruction.

The E stage 5 comprises a one-stage store buffer, and besides, in some high-function instructions, the execution itself of the instruction is performed in a pipeline manner, and therefore, an actual effect of pipeline processing of five or more stages is obtainable.

Each stage operates independently from the other stages, and theoretically the five stages make perfectly independent operations. Each stage can perform one-time processing in a minimum of two clocks cycle. Accordingly, ideally, the pipeline processing progresses one after another on two clocks basis.

The data processing system of the present invention comprises some instructions which cannot be processed only by the basic pipeline processing of one time such as an operation between memory and memory or a memory indirect addressing, but the data processing system of the present invention is designed in such a manner that a balanced pipeline processing can be performed whenever possible for processing of these instructions.

For the instruction having a plurality of memory operands, pipeline processing is performed based on the number of memory operands by decomposing it into a plurality of pipeline processing units (step code) at the decoding stage.

A detailed description of the decomposing method of the pipeline processing unit is disclosed in Japanese Patent Application Laid-Open No. 63-89932 (1988) (incorporated herein by reference).

Also, under the parallel execution mode, in certain cases two instructions are processed as one step code.

Information transferred from the IF stage 1 to the D stage 2 is an instruction code itself. Information transferred from the D stage 2 to the A stage 3 includes two kinds of information, one on operation specified by an instruction (called a D code 12) and the other on address calculation of an operand (called an A code 13).

Information transferred from the A stage 3 to the F stage 4 includes an R code 14 comprising an entry address of a microprogram and a parameter of the microprogram and an F code 15 comprising an operand address and information for memory access.

Information transferred from the F stage 4 to the E stage 5 is an E code 16 comprising operation control information and literal and an S code 17 comprising an operand and its operand address.

EIT detected in the stage other than the E stage 5 does not start the EIT processing until the code thereof reaches the E stage 5. This is because only the instruction processed in the E stage 5 is an instruction at the step of executing, and the instructions having been processed between the IF stage 1 and the F stage 4 do not reach the step of executing yet. Accordingly, for the EIT detected in the stage other than the E stage 5, the detection thereof is recorded in the step code, and it is only transmitted to the following stage.

(3.3) "Processing of Each Pipeline Stage"

As shown in FIG. 29, for the sake of convenience, names are given to the input and output step codes of each pipeline stage. The step codes perform processing relating to the operation codes, and include two series; a series becoming entry addresses of microprograms and parameters for the E stage 5 and a series becoming operands for microinstructions of the E stage 5.

(3.3.1) "Instruction Fetch Stage"

The instruction fetch stage (IF stage) 1 fetches an instruction from the memory or the branch buffer, inputs it to the instruction queue 30, and outputs an instruction code 11 to the D stage 2.

Input of the instruction queue 30 is performed in an aligned four-byte unit. In the case where an instruction is fetched from the memory, a minimum of one clock cycle are required for the aligned four bytes. In the case where the branch buffer hits, fetching can be made in one clock per aligned four bytes.

The output of the instruction queue 30 synchronizes with a clock of the instruction decoding stage 1, and is managed by an output pointer -two bytes basis, so that 32-bits data can be outputted to the I bus 105 of the instruction decoding unit 22 per one clock cycle.

The 32-bits data is outputted to the I bus 105 from the position which is pointed by the output pointer at the $\phi A$ of the D stage 1. The value of the output pointer is incremented by +0 or +1 corresponding to a direction from the instruction decoding unit 21.

The 32-bits data is outputted to the I bus 105 from the position which is pointed by the output pointer updated at the $\phi C$ of the D stage 1. The value of the output pointer is incremented by +0, +1 or +2 corresponding to a direction from the instruction decoding unit 12.

Accordingly, the instruction queue 30 can output a maximum of six bytes during two clocks. Immediately after a branch, two bytes of the instruction base part can also be transferred directly to the instruction decoding unit 21 by by-passing the instruction queue 30.

Control of registering and clearing of the instruction to the branch buffer, management of addresses of the instructions to be prefetched and control of the instruction queue 30 are also performed in the IF stage 1.

The EITs detected in the IF stage 1 include a bus access exception in fetching an instruction from the memory or an address translation exception due to memory protection violation.

(3.3.2) "Instruction Decoding Stage"

The instruction decoding stage (D stage) 2 decodes an instruction code inputted from the IF stage 1.

Decoding is performed by two clocks cycle basis using the main decoder 31 and subdecoder 32 in the instruction decoding unit 22. An instruction code of 0 to 6 bytes is consumed in the decoding processing during one operation thereof.

The instruction code 11 on the I bus 105 is fetched to the both decoder 31 and 23 at the φA.

An immediate value peculiar to an instruction and an extension data such as a displacement used for address calculation are etched to the extension data processing unit 33 from the I bus 105 at the φC, thereafter processings such as code extension are performed.

In the subcode validity judging circuit 34, it is judged that decoded result by the subdecoder 32 is valid or not.

By one decoding operation, the A code 13 as address calculation information and the D code 12 as intermediate decoded result of the operation code are outputted to the A stage 3. The A code 13 includes a control code for controlling address calculation and a maximum 23 bits of address modification information. The D code 12 includes a control code for controlling instruction execution and a literal information. The D code 12 is held in the D code latch 35.

In the D stage 2, control of the PC calculation unit 23 of each instruction and outputting processing of the instruction code from the instruction queue 30 are also performed.

There are a reserved instruction exception and an odd number address jump trap at prebranching as EITs detected in the D stage 2. Various EITs sent from the IF stage are encoded in to the step code and transferred to the A stage 3.

(3.3.3) "Operand Address Calculation Stage"

Processing functions of the operand address calculation stage (A stage) 3 are roughly divided into two parts. One is processing for post-decoding of the operation code using the second stage decoder of the instruction decoding unit 22 and the other is for calculation of an operand address in the operand address calculation unit 24, The post-decoding processing of the operation code inputs the D code 12 and outputs the R code 14 comprising write reserve of register and memory, an entry address of a microprogram and parameters for the microprogram. Part of the D code 12 is not decoded and becomes the R code 14 intact through the latch 37 and the subcode latch 38.

The R code 14 is held in the R code latch 40 of the micro ROM unit 25. In addition, the write reserve of the register or memory is for preventing a wrong address calculation by re-writing the content of the register or memory referred in the address calculation of an instruction with the instruction preceding on the pipeline.

The write reservation of the register and the memory is disclosed in Japanese Patent Application No.62-144394 (1987).

The operand address calculation processing inputs the A code 13, performs addition in the operand address calculation unit 24 according to the A code 13 or performs address calculation by combining memory indirect reference, and outputs the result of the calculation as the F cord 15. At this time, a conflict check is done in reading-out of the register and the memory attending on the address calculation. If a conflict is indicated because the preceding instruction has not completed the writing processing to the register or the memory, the processing waits until the preceding instruction completes the write processing in the E stage 5.

The EITs detected in the A stage 3 include the reserved instruction exception, privileged instruction exception, bus access exception, address translation exception and debug trap generated by an operand break point hit at memory indirect addressing.

These EITs detection informations are reflected in the R code 14 and F code 15.

(3.1.4) "Micro ROM Access Stage"

Processing of the operand fetch stage (F stage) 4 is also divided roughly into two parts. One is access processing of the micro ROM, particularly called the R stage 6. The other is operand prefetch processing, particularly called the OF stage 7. The R stage 6 and the OF stage 7, which do not necessarily operate at the same time, operate independently depending on whether or not the memory access right can be acquired.

The R code 6 generates the E code 16, which is an execution control code at the next E stage 5, with respect to the R code 14 held in R code latch 40.

According to the micro ROM 42 is executed by a microentry address in the R code 14. The read out microinstruction is decoded by the microinstruction decoder 44. In the case where processing for one R code 14 is decomposed into two or more microprogram steps, the first micro ROM is used in the E stage 5, and the following R code 14 waits for micro ROM access.

Sequence of microinstruction is managed by the microsequence control unit 41. Micro ROM access using the R code 14 is performed when the last micro instruction is executed in the preceding E stage 5. In the data processing system of the present invention, almost all of the basic instruction are executed in one microprogram step, therefore, there are many actual cases in which micro ROM accesses to the R code 14 are performed one after another.

There is EIT such as a self debug trap by PC break point hit to be detected anew in the R stage 4, and detection information is transferred to the E code 16.

When the R code 16 indicates the EIT of instruction processing re-execution type, the microprogram for that EIT processing is executed, and therefore the R stage 6 fetches the microinstruction according to the R code 14. In case where the R code 14 indicates an odd address jump trap, the R stage 6 transmits it through the E code 16. This is for pre-branch, and in the E stage 5, if no branch is made in that E code 16, an odd address jump trap is generated with the pre-branch being effective.

(3.3.5) "Operand Fetch Stage"

The operand fetch stage (OF stage) 7 performs operand prefetch processing among the above-mentioned two processings performed in the F stage 4.

Operand prefetch processing inputs the F code 15 and outputs the fetched operand and the address thereof as the S code 17. The operand address is stored in the address registers 48, and the operand data is stored in the memory data registers 58.

One F code 15 may cross over the word boundary, but specifies operand fetching of four bytes or less. The F code 15 also comprises specifying of whether or not access to the operand is to be performed. In the case where the operand address itself or the immediate calculated in the A stage 3 is transferred to the E stage 5, no operand prefetch is performed, and the content of the F code 15 is transferred as the S code 17 to the address registers 48.

In the case where the operand intended to be prefetched coincides with the operand intended to be write-processed in the E stage 5, no operand prefetching is performed from the memory, but operation of the prefetch is performed by by-passing it. For the I/O area, the operand prefetch is delayed, and operand fetch is performed only after all the preceding instructions have been completed.

The EITs detected in the OF stage 7 include a bus access exception, an address tranlation exception, and a debug trap generated by a break point hit to the operand prefetch.

When the F code 15 indicates an EIT other than the debug trap, it is transferred to the S code 16, and no operand prefetch is performed. When the F code 15 indicates a debug trap, the same processing as the case where no EIT is indicated for that F code 15 is performed, and the debug trap is transferred to the S code 17.

(3.3.6) "Execution Stage"

The execution stage (E stage) 5 operates with the E code 16 and the S code 17 taken as inputs. This E stage 5 is a stage for executing instructions, and all processings performed in the stages before and in the F stage 4 are pre-processings for the E stage 5.

In the case where a jump instruction is executed in the E stage 5 or the EIT processing is started, all the processings from the IF stage 1 to the F stage 4 are disabled.

The E stage 5 is controlled by microprograms, and the instruction is executed by executing a series of microprograms starting with the entry address of microprogram indicated in the R code 14.

Read of the micro ROM and execution of the microinstruction are performed in a pipeline manner. Accordingly, a conditional branch in the microprogram is processed one step after the relating operation processing. The E stage 5 can also perform pipeline processing of an operand store of four bytes or less and the following microinstruction execution by utilizing the store buffer in the data operation unit 26.

Also, under the parallel execution mode, two instructions are executed in parallel by operating the sub ALU 59 independently from another arithmetic units. In the E stage 5, the write reserve to the register and the memory performed in the A stage 3 is released after write of the operand.

In the case where a conditional branch instruction generates a branch in the E stage 5, the branch prediction for that conditional branch instruction has been wrong, and therefore rewriting of the branch history is performed.

The EITs detected in the E stage 5 include bus access exception, address translation exception, debug trap, odd address jump trap, reserved function exception, illegal operand exception, reserved stack format exception, zero divided trap, unconditional trap, conditional trap, delayed context trap, external interruption, delay interruption, reset interruption and system faults.

The EITs detected in the E stage 5 are all EIT-processed, but the EITs which are detected between the IF stage 1 and the F stage 4 before the E stage 5 and are reflected in the R code 14 or the S code 17 are not necessarily EIT-processed.

All the EITs which are detected among from the IF stage 1 to the F stage 4, but do not reach the E stage 5 because the preceding instruction has executed a jump instruction in the E stage 5 or the like are all canceled. The instruction having caused that EIT is assumed to have not been executed from the beginning.

Various interruption are accepted directly to the E stage 5 at a timing of a pause of the instruction, and necessary processing is executed by microprograms. Processings of other various EITs are performed by microprograms.

(3.4) "Status Control of Each Pipeline Stage"

Each stage of the pipeline has an input latch and an output latch, and is based on operation independent of other stages.

Each stage starts the next processing after such whole processes as the one-preceding processing has been completed, the result of that processing has been transferred from the output latch to the input latch of the next stage, and all input signals required for the next processing have been prepared in the input latch of the stage of its own.

This means that each stage starts the next processing after such whole processes as all the input signals to the next processing outputted from the one-preceding stage are enabled, the result of the current processing is transferred to the input latch of the post-stage, and the output latch becomes empty.

In other words, it is required that all input signals are prepared at a timing with one clock before the operation start in each stage. If the input signals are not all prepared, that stage is put in the waiting state (input waiting). For transferring from the output latch to the input latch of the next stage is done, it is required that the input latch of the next stage is in the empty state, and when the input latch of the next stage is not empty, the pipeline stage is also put in the waiting state (output waiting). If the required memory access right cannot be acquired, or wait is inserted into the memory access under processing, or another pipeline conflict occurs, the processing itself of each stage is delayed.

(3.5) "Control of Program Counter"

All of the step codes existing on the pipeline of the data processing system of the present invention have a possibility of being for another instruction, and for this reason, the value of the program counter is controlled on a step code basis. All of the step codes have a program counter value of the instruction whereon that step code is based. The program counter value following through each stage of the pipeline while accompanying the step code is called a step program counter (SPC). The SPC is transferred sequentially from one pipeline stage to the other.

In the case where one step code is formed by two instructions under the parallel execution mode, the address of preceding instruction becomes the SPC.

Figure 30:
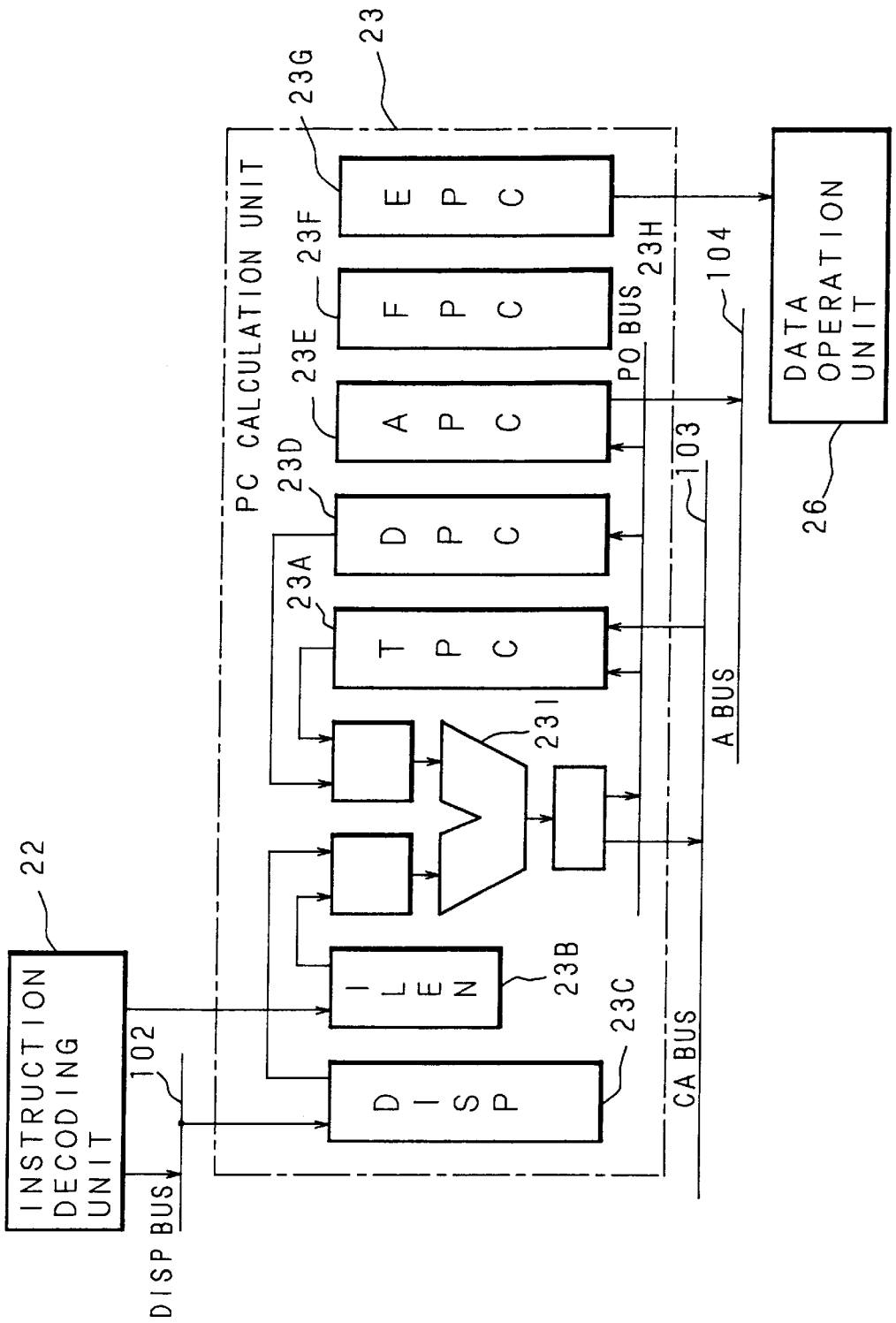
FIG. 30 is a detailed block diagram showing a configuration of a PC calculation unit.

FIG. 30 is a detailed block diagram showing a configuration of the PC calculation unit 23.

A TPC denoted by a reference numeral 23A is a latch for holding a temporally value at each decoding cycle.

An ILEN denoted by a reference numeral 23B is a latch for holding a code length which is processed at each decoding cycle.

A DISP denoted by a reference numeral 23C is a latch for holding a branch displacement at a pre-branching.

A DPC denoted by a reference numeral 23D is a latch for holding a PC value of an instruction under processing at the D stage 2.

An APC denoted by a reference numeral 23E is a latch for holding a PC value of an instruction under processing at the A stage 3.

An FPC denoted by a reference numeral 23F is a latch for holding a PC value of an instruction under processing at the F stage 4.

An EPC denoted by a reference numeral 23G is a latch for holding a PC value of an instruction under processing at the E stage 5.

A reference numeral 23H denotes a PO bus which transfers an adding result by a PC adder 23I to the TPC 23A, DPC 23D and APC 23E.

In addition, abovementioned latches are constituted by a master/slave system at need.

The PC calculation unit 23 operates in synchronous with an instruction decoding processing at the D stage 2.

Just after resetting the whole system or in the case where a jump occurs at the E stage 5, a start address of the instruction train to be executed is fetched to the TPC 23A through the CA bus 103. Also, at this time, the ILEN 23B is cleared to zero.

At first, operation of the PC calculation unit 23 under the sequential execution mode is described.

At the end of every decoding cycle, a code length which is processed at each decoding cycle is outputted from the instruction decoding unit 22 and inputted to the ILEN 23B.

In the PC calculation unit 23, values of the TPC 23A and the ILEN 23B are added by the PC adder 23I and the adding result is rewritten in the TPC 23A through the PO bus 23H. In other words, in the TPC 23A, the start address of the instruction code which is processed at every decoding cycle.

In the case where the code length which is decoded at the last decoding cycle of one instruction, the adding result is written in the DPC 23D too through the PO bus 23H. In this case, the adding result indicates the start address of the next instruction.

At the first decoding cycle, the start address of the instruction is calculated because PC calculation is executed with one cycle delay with respect to instruction decoding in timing.

The value of the DPC 23D is transferred to the APC 23E, FPC 23F and EPC 23G in synchronous with transferring of a step code. In the case where a processing of the step code, which is outputted at the first decoding cycle of one instruction, in the A stage 3 is started just after decoding, the adding result by the PC adder 23I is written in the APC 23E too through the PO bus 23H.

Next, operation under the parallel execution mode is described.

In the case where the decoded result by the subdecoder 32 is valid and the instruction is the two bytes instruction, a code length (four bytes) including the instruction code processed by the subdecoder 32 is inputted to the ILEN 23B. Accordingly, in the PC calculation unit 23, the PC value of the instruction which is decoded by the subdecoder 32 is not calculated but start address of the next instruction is calculated.

In the case where the decoded result by the subdecoder 32 is valid and in the case where the instruction decoded by the subdecoder 32 is the G-format instruction whose first operand locates on a register or is the first half word of the E-format instruction, the code length (two bytes) avoiding the instruction code processed by the subdecoder 32 is inputted to the ILEN 23B. Accordingly, in the PC calculation unit 23, the start address of the instruction which is decoded by the subdecoder 32. In this case, the code length which is outputted at next decoding cycle is corrected by "+2" bytes. This correction is executed at the instruction decoding unit 22.

As described above, the PC values are calculated with no contradiction and flow through the pipeline.

(4) "Operation in the Parallel Execution Mode"

As aforementioned, the data processing system of the present invention has two execution modes, a sequential execution mode for processing the instruction one by one and a parallel execution mode capable of processing two instructions in parallel in a data calculation unit 26.

In the parallel execution mode, when a certain condition is met, an ALU operation instruction between literal-register and register-register of a short format, or a first step code of the G-format and a first step code of the E-format in which a first operand is on the register are executed in parallel with a preceding instruction.

The subcode validity judging circuit 34 of the instruction decoding unit 22 judges whether the aforesaid certain condition is met or not.

That is, by setting an executed mode control bit in the execution mode control register included in a control registers 50, the execution mode is selected. When the bit is set to "1", the data processing system of the invention operates in a parallel execution mode, and when set to "0", operates in a sequential execution mode.

The value of execution mode control bit can be set by softwares. In the following, the operation of the data processing system of the invention in the parallel execution mode will be described in detail.

(4.1) "Generation of Step Code"

A step code which is a unit to be processed in a pipe line is generated in a D stage 2. A D code 12 which is the step code generated in the D stage 2 is consisting of a decoded result of the main decoder 31 and a decoded result of the subdecoder 32.

Hereinafter, a corresponding portion to the decoded result of the main decoder 31 in each step code of the D Code 12, R Code 14 and E Code 16 is referred to as a main code, and a portion corresponding to the decoded result of the subdecoder 32 is referred to as a subcode. The main code and subcode are basically processed independently in each pipe line stage.

Figure 31:
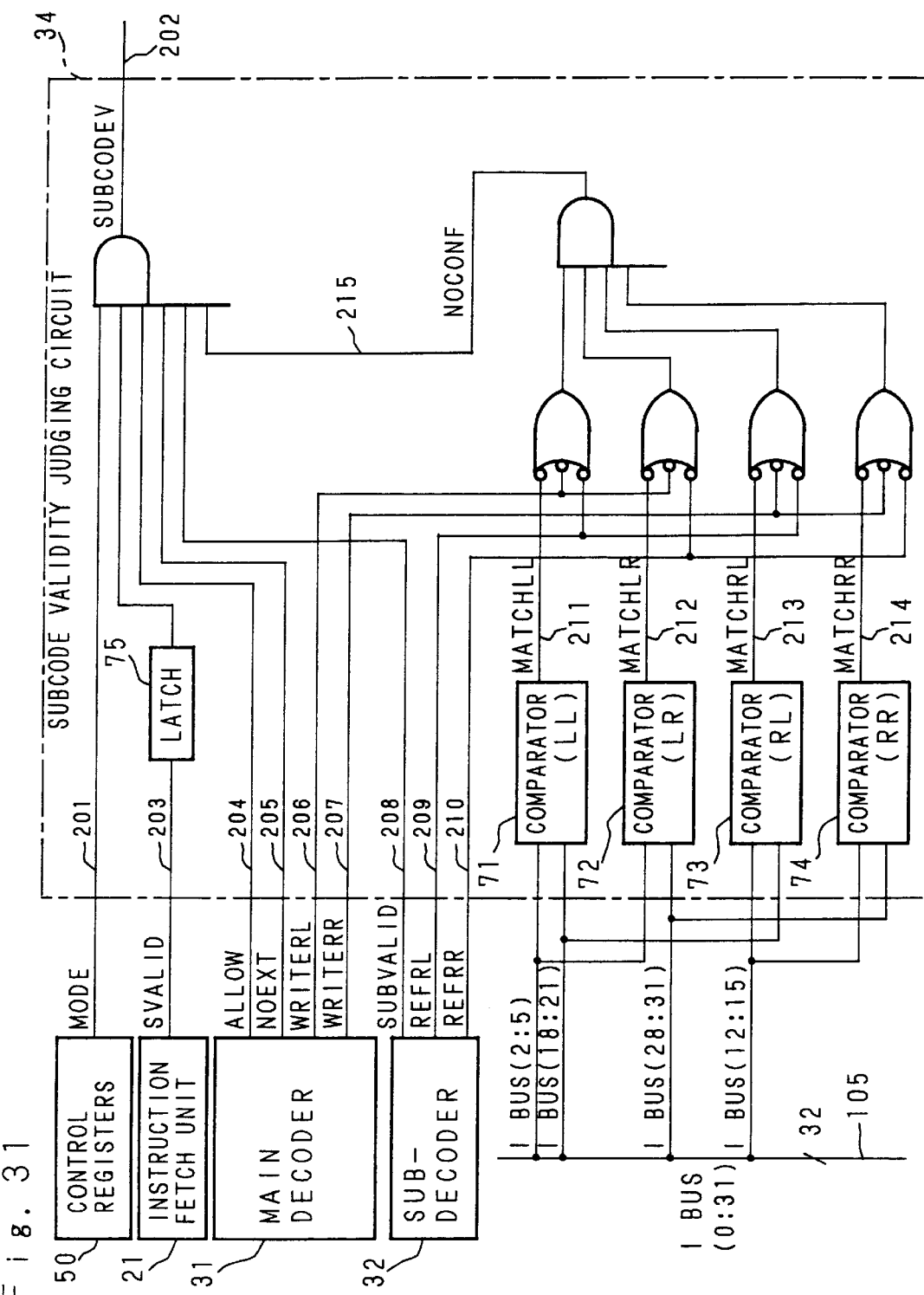
FIG. 31 is a detailed block diagram of a subcode validity judging circuit thereof.

FIG. 31 shows a detailed circuit diagram of the subcode validity judging circuit 34.

In the figure, reference numerals 71 to 74 generally indicate comparators, which compare two 4-bit data fetched at φA, and output match signals 211 to 214 which become "1" when the two 4-byte data have coincided.

The numeral 75 denotes a latch holding the value of SVALID signal 203 at φA. Each logic gate does not correspond directly to hardwares but shows logical meaning. For simplification of the explanation, a signal for timing control is omitted.

In the instruction decoding unit 22, bits 0 to 15 (hereinafter represented as IBUS(0:15)) of a 32-bit instruction code outputted on the I bus 105 at φA are fetched into the main decoder 31 and IBUS(16:31) into the subdecoder 32 and decoded. Cutting of fields which are parameters of register number, size etc. is executed in each decoder.

Since the two instructions can be executed in parallel only when the instruction being decoded in the main decoder 31, and the instruction being decoded in the subdecoder 32 are different, in the following, for the sake of convenience the instruction being decoded in the main decoder 31 is represented as the instruction 1, and the instruction being decoded in the subdecoder 32 as the instruction 2 for explanation.

The subcode validity judging circuit 34 fetches IBUS (2:5), IBUS(12:15), IBUS(18:21) and IBUS(28:31) corresponding to the register number specifying field, and the SVALID signal 203 (where, "1": valid) showing valid/invalid of data on the IBUS(16:31) inputted from the instruction fetch unit 21 at φA. The value of SVALID signal 203 at φA is kept in the latch 75.

The value of the execution mode control bit in the execution mode control register is inputted to the subcode validity judging circuit 34 as the MODE signal 201. In the subcode validity judging circuit 34, first, the specified registers are detected for coincidence.

Figure 32:
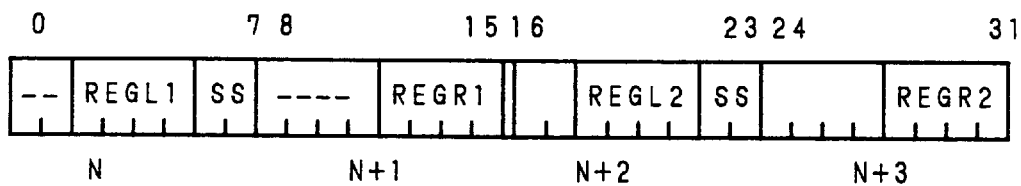
FIG. 32 is a schematic view showing the state of instruction code on an I bus, when instructions of a shortened format executing operation between the two registers are in series.

FIG. 32 is a schematic view showing the condition of instruction code on the I bus 105, when the short format instruction executing operations between the two registers are in series.

In this case, four registers, REGL 1, REGR 1, REGL 2 and REGR 2 are specified. With respect to the other instruction, when the operand is specified by the register, the register number is specified by either or both of the register number specifying fields aforementioned.

The subcode validity judging circuit 34 checks whether the register specified as the operand by the instruction 2 is rewritten by the instruction 1.

First, the IBUS(2:5) (REGL 1) and the IBUS(18:21) (REGL 2), the IBUS(2:5) (REGL 1) and the IBUS(28:31) (REGR 2), the IBUS(12:15) (REGR 1) and the IBUS(18:21) (REGL 2), and the IBUS(12:15) (REGR 1) and the IBUS (28:31) (REGR 2) are compared respectively in the comparators 71 to 74, and MATCHLL signal 211, MATCHLR signal 212, MATCHRL signal 213 and MATCH RR signal 214 which become "1" when they are coincided are generated.

Portions of decoded results of the main decoder 31 and the subdecoder 32 are inputted to the subcode validity judging circuit 34. From the main decoder 31, ALLOW signal 204, NOEXT signal 205, WRITERL signal 206 and WRITERR signal 207, from the subdecoder 32, SUBVALID signal 208, REFRL signal 209 and REFRR signal 210 are inputted respectively.

The ALLOW signal 204 indicates that the two instructions can be executed in parallel, provided the subcode is valid and there is no conflict in the operand.

The ALLOW signal 204 is dependent only on the instruction code and regulates each instruction.

When the instruction being decoded in the main decoder 31 is the instruction code generating a last step code of one instruction and not the instruction (jump instruction, subroutine jump instruction etc.) which changes the instruction processing sequence, nor the instruction (dividing instruction starting a zero divided trap when a divisor is zero, trap instruction executing system call, etc. which possibly starts a trap after executing the instruction), the ALLOW signal 204 becomes "1". It may be the instruction executed by plural micro-instructions such as the multiplying instruction, or the instruction generating the last step code of the instruction processed by decomposed into plural step codes. Also, it may have a memory operand. When the immediate value peculiar to the instruction follows, it becomes "0".

The NOEXT signal 205 becomes "1" when the instruction 1 has no extend data for address calculation of the operand, and the addressing mode is not a multistage in direct mode. When the NOEXT signal 205 is "1", it indicates that IBUS(16:31) fetched into the subdecoder 32 is the instruction code. It becomes "1" when a register direct mode, register indirect mode, stack pop mode and stack push mode are selected as the addressing mode, or the operand is not specified by the addressing mode.

The WRITERL signal 206 becomes "1" when the instruction 1 rewrites the content of register specified by the REGL1 field. However, when REGL1 is not the specifying field of the register number, it certainly becomes "0". For example, by the moving (MOV) instruction of L-format it becomes "1".

The WRITERR signal 207 becomes "1" when the instruction 1 rewrites the content of register specified by the REGR1 field. However, when REGR1 is not the specifying field of the register number, it certainly becomes "0". For example it becomes "1" when the addressing mode is a register direct mode by the adding (ADD) instruction of Q-format.

The SUBVALID signal 208 shows that the decoded result in the subdecoder 32 was valid, and showing that the instruction is executable in the sub ALU 59.

A table of instruction which make the subcode valid signal "1" is shown in FIG. 33. Those instructions are, the one operand instruction whereby the register is specified as the operand, two operand instructions between register-register and literal (a small immediate value specified in the instruction code)-register, the first step code of the G-format instruction where the source operand is the register, and the first step code of the E-format instruction. That is, it becomes "1" when the instruction is decomposed into plural step codes and processed and the first operand is saved, or the instruction is two bytes having no memory operand and is the ALU operation instruction which finishes execution within two clock cycles. In these instructions, the instruction is executed without exception.

The REFRL signal 209 becomes "1" when the instruction 2 refers to the content of register specified by the REGL 2 field. When REGL 2 is not the specifying field of the register number, it certainly becomes "0". For example, it becomes "1" by the MOV instruction of S-format.

The REFRR signal 210 becomes "1" when the instruction 2 refers to the content of register specified by the REGR 2 field. When REGR 2 is not the specifying field of the register number, it certainly becomes "0". For example, it becomes "1" when the addressing mode is the register direct mode by the ADD instruction of Q-format, or the addressing mode is the register direct mode at the first step code of G-format. Since the register is not referred to at the first step code of E-format, both the REFRL signal 209 and the REFRR signal 210 become "0".

In the subcode validity judging circuit 34, whether two instructions can be executed in parallel is judged based upon these signals, and the subcode validity signal 202 is outputted. Based upon compared results of comparators 71 to 74 and inputs from the main decoder 31 and the subdecoder 34, whether the register referred to by the instruction 2 is rewritten by the instruction 1 is checked. When there is no conflict of operand between the two instructions, the NOCONF signal 215 becomes "1".

The subcode validity signal 202 becomes "1", when the data processing system of the invention is operated in a parallel execution mode (MODE signal 201="1"), all of the 32 bits of instruction code fetched at φA are valid (SVALID signal 203="1"), the instruction 1 allows to validate the subcode (ALLOW signal 204="1"), the instruction 2 is able to generate the subcode (SUBVALID signal 208="1") and there is no conflict between the registers by the instruction 1 and instruction 2 (NOCONF signal 215="1").

When the subcode validity signal 202 is "0", the subcode become invalid, thus processing related to the subcode is not executed in the later pipeline stage.

The instruction decoding unit 22 outputs available instruction length to the output pointer control unit and PC calculation unit 23 of an instruction queue 30. The instruction decoding unit 22, in the shortened format instruction, informs the output control unit and PC calculation unit 23 of the instruction queue 30 that 4 bytes instruction code is consumed by one decoding when the subcode is validated. The PC (SPC) of the step code in this case becomes the PC value of the instruction 1 and the PC value of the instruction 2 is not calculated.

In the first step code of G-format or E-format, though the instruction decoding unit 22 informs the output control unit of the instruction queue 30 that 4 bytes are used by one decoding, outputs the value of 2 bytes as one decoding to the PC calculation unit 23, and in the next decoding cycle, outputs the value obtained by adding the value of 2 bytes to the instruction length used in the cycle to the PC calculation unit 23. In such a manner, the instruction decoding unit 22 is able to calculate properly the instruction addresses of G-format and E-format.

As described above, by the decoded results of the main decoder 31 and the subdecoder 32, the D code 12 and the A code 13 are generated. The generated D code 12 is held in a D code latch 35. The sub-D code is stored in the subcode part 35A.

Figure 34:
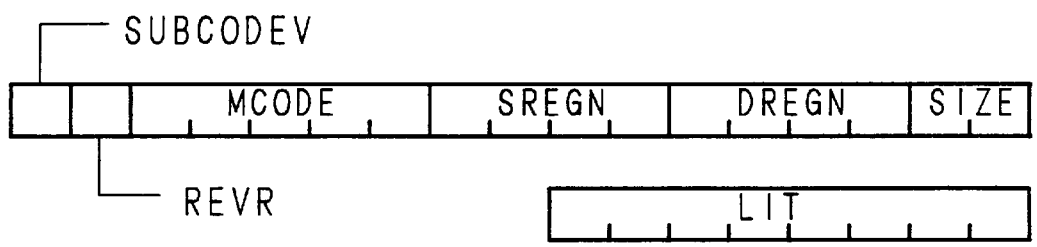
FIG. 34 is a schematic view of a sub-D Code format of a data processing system of the present invention.

A configuration of the sub-D code is shown schematically in FIG. 34. It is constituted by the operand size, source and destination register numbers, intermediate code as the intermediate decoded result, literal, the register write in reservation control signal which become "1", when written into destination register and the subcode validity signal. A literal value of the specified literal is zero extended to 8 bits. To the subcode validity signal, the SUBCODEV signal 202 outputted from the subcode validity judging circuit is set as it is.

As aforementioned, when the subcode is validated, one step code is generated by the two instructions, and this step code is processed in the later pipeline stage as one processing unit of the pipeline.

(4.2) "Processing of Step Code"

Processing in the later pipeline stage when the subcode is valid will be explained.

In the A stage 3, a usual processing is executed with respect to the main code. The intermediate decoded result is decoded in a second decoder 36, and the result is outputted to the R code latch 40 together with the content of latch 37. With respect to the subcode, the register write-in reservation is mode only when writing into the register. Signals other than the register write-in reservation control signal are held temporarily in a subcode latch 38, and outputted to a subcode part 40A of the R code latch 40.

Figure 35:
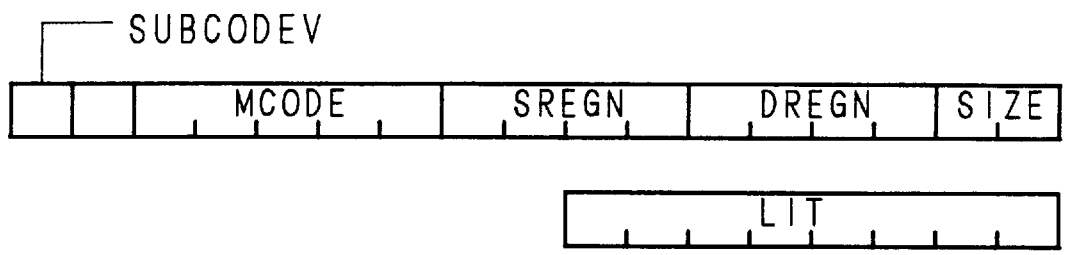
FIG. 35 is a schematic view of a sub-R Code format of a data processing system of the present invention.
Figure 37A:
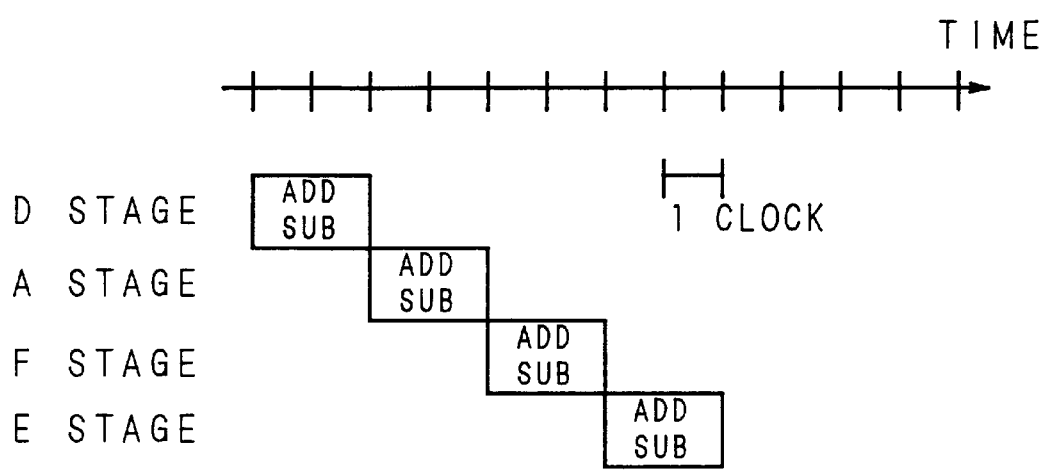
FIG. 37 is a schematic view showing the pipe line processing condition of the instruction train stated above.
Figure 37B:
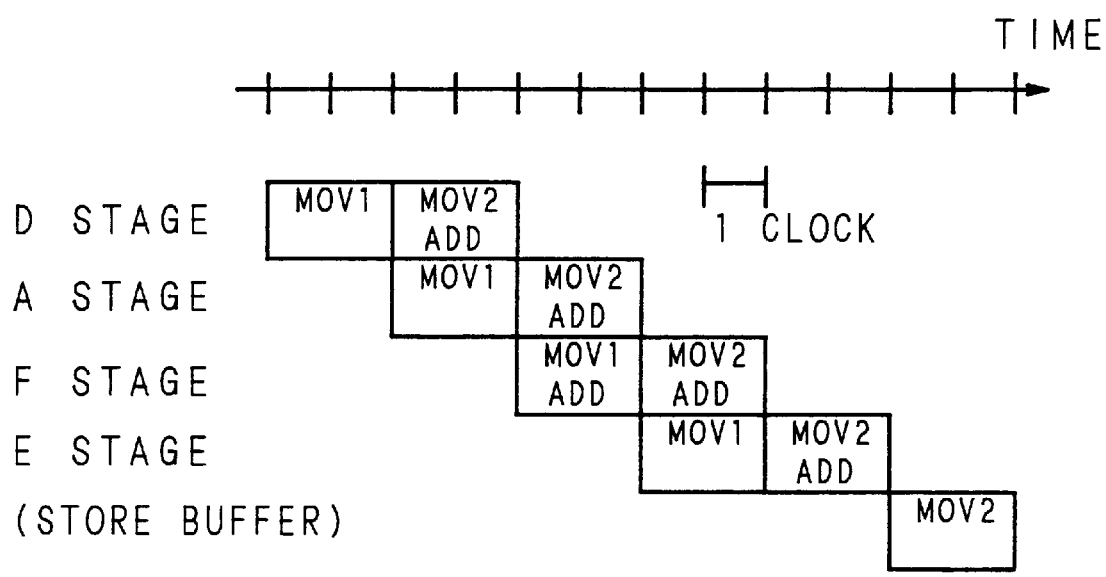
Figure 37C:
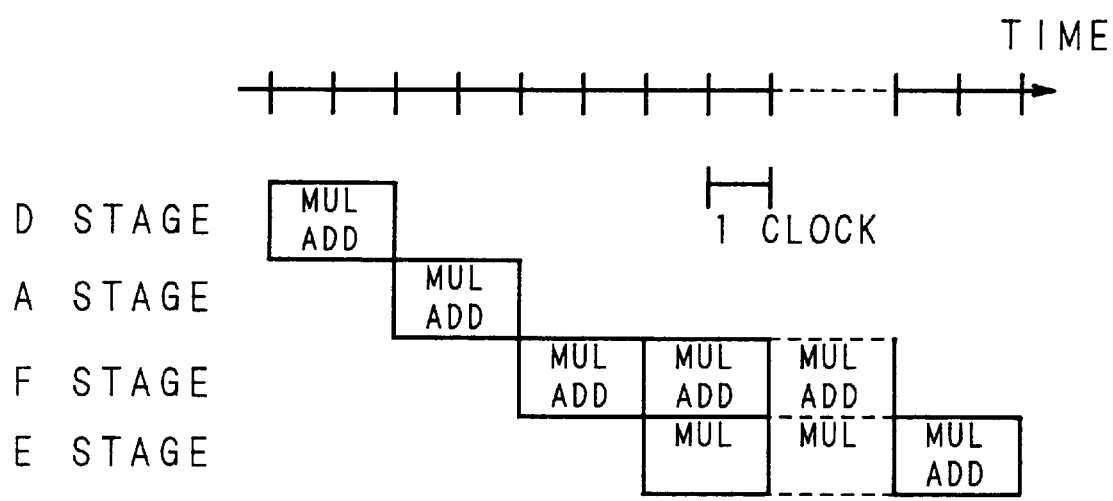
Figure 37D:
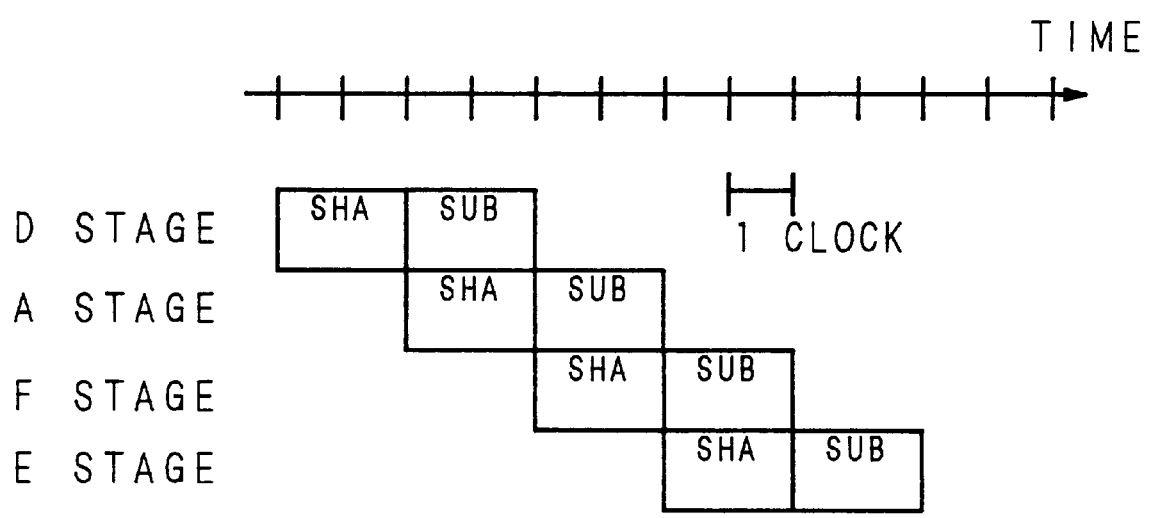
Figure 37E:
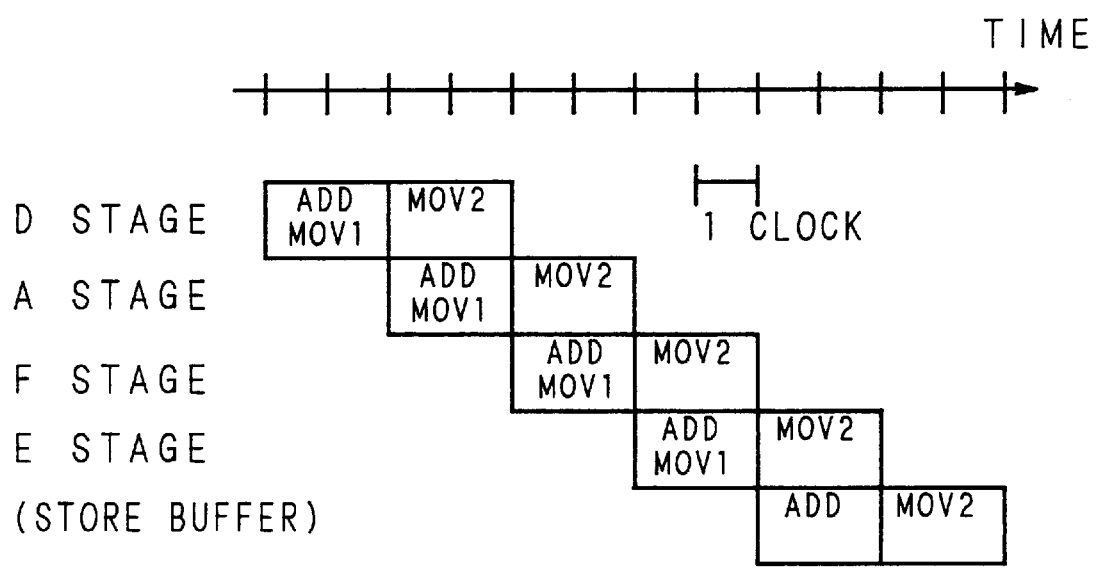
Figure 37F:
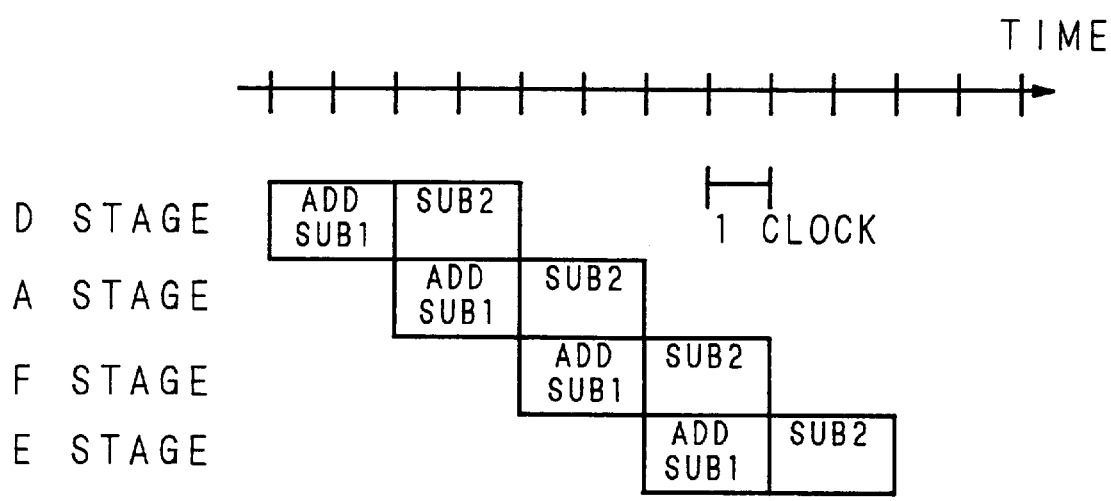

The content of sub-R code is shown in FIG. 35. Portions other than the register write-in signal of the sub-D code become sub-R code as it is. When the memory operand is present, address calculation is executed in the address calculation unit 24.

In an R stage 6, the micro ROM 42 is accessed and the micro instruction read from the micro ROM 42 is decoded with respect to the main code, and the execution control signal is generated. With respect to the subcode, hardwired decoding is executed to generate signals for output control from the register file 52 or SP calculation unit 49 to the SA bus 109 and SB bus 110, operation control of the sub ALU 59 and input control and flag control from a D bus 111 to the register file 52 or the SP operation unit 49. These signals are sent to the sub ALU control unit 46 and a flag control unit 47 of an execution control unit 45. These signals related to the subcode are validated when the last micro instruction relative to the instruction 1 is read.

In the OF stage 7, the operand is fetched when necessary.

In the E stage 5, instruction is executed in the data operation unit 26.

Processing of the main code is executed by an arithmetic unit such as an ALU 53 or barrel shifter 54 according to indication of the micro instruction. Necessary data are transferred via the S1 bus 106, S2 bus 107 and DO bus 108.

Processing of the subcode is executed in the sub ALU 59 in synchronism with the execution cycle of the last micro instruction of the instruction 1. The content of selected register is read out to the SA bus 109 and SB bus 110 from the register file 52 or the SP calculation unit 49. When a literal is specified as the source operand the 8-bit literal value is zero extended and read out to the SA bus 109. The contents of SA bus 109, SB bus 110 are inputted to the sub ALU 59, and the specified calculation is executed by control of the sub ALU control unit 46, the calculation result is returned to and written in the register file 52 or SP calculation unit 49 via the D bus 111.

When a register written in from the DO bus 108 and a register written in from the D bus 111 are same in the last microstep of the instruction 1, it is written in from the D bus 111. A flag of PSW 51 is updated by operation results of the sub ALU 59 and the last micro instruction of the instruction 1. UpdAting of the flag is controlled by the flag control unit 47.

To the flag changed as the result of execution of the instruction 2, the operation result in the sub ALU 59 is reflected, and to the flag which does not change by the execution result of the instruction 2 but changes as the result of execution of the instruction 1, the operation result of the instruction 1 is reflected.

The flag not changed neither by the execution result of the instruction 1 nor of the instruction 2 does not change.

When the subcode is generated for the first step code of E-format or G-format, a literal or a register value specified as the first operand (source operand) is saved in a working register in the register file 52 via the SA bus 109, sub ALU 59 and DBUS 111. In this case, processing of the subcode is only the saving processing of the first operand, so that the operation result in the sub ALU 59 is not reflected to PSW 51. In the second step code of the instruction 2, instructions are executed using the first operand value saved in the working register.

(4.3) "EIT Processing"

When the subcode is validated with respect to the 2-byte instruction, EIT other than a self-debug trap is not started with respect to the instruction 2.

When any exception is detected with respect to the instruction 1, processing with respect to the instruction 2 is not executed and the processing is reexecuted from the instruction 1.

Even when the instruction 1 is processed by plural microinstructions, since the instruction 2 is processed in synchronism with the last microinstruction of the instruction 1, the instruction 2 will never be executed even though the exception has been detected in the instruction 1.

For the instruction which starts trapping other than those associated with a store buffer by the instruction 1, the ALLOW signal 204 certainly becomes "0". This is because that, when returning to the original program from an EIT processing handler related to trap, the processing is restarted from the instruction following the one which has started trapping. For example, in the dividing instruction which possibly starts zero divided trap, the ALLOW signal 204 becomes "0".

The trap such as a bus access trap generated with respect to store buffer processing is received at an instruction interval. Accordingly, it is not necessary to receive between the instructions 1 and 2. Though external interruption is received at the instruction interval, it is not concerned with a context being executed, thus it may not be received between the instructions 1 and 2, but before executing the instruction 1 or after executing the instruction 2.

When the subcode is validated with respect to the first step code of E-format or G-format, interruption may be received between the first and second step codes of the instruction 2. In this case, only saving processing of the source operand is executed in the first step code, and the processing is reexecuted from the instruction 2 after the interruption processing.

As described above, in the data processing system of the invention, EIT processing may be executed in the parallel execution mode exactly as same as in the sequential execution mode, and it is not necessary to add extra functions for the EIT processing in the parallel execution mode.

When the program is debugged using the debug function (PC break, operand break, trace) supported by the data processing system of the invention, debug events must be detected and checked for every instruction and the sequential execution mode must be selected as the operation mode.
(4.4) "Concrete Examples"

Executing procedures of the instruction by the data processing system of the invention will be explained according to same concrete examples.

FIG. 36(*a*) to FIG. 36(*f*) respectively show examples of instruction train, and FIG. 37(*a*) to FIG. 37(*f*) show pipeline processing of the respective instruction train.

In FIG. 35, characters after a colon(:) represent formats, "#" represents immediate values and "@( )" represents that there is an operand on a memory having a value in the brackets as the address.

MOV 1 and MOV 2 in FIG. 37 indicate that the moving (MOV) instruction is decomposed in two step codes and processed, MOV 1 showing the first step code of the MOV instruction and MOV 2 showing the second step code of the MOV instruction. In FIG. 37, for simplification of the explanation, the front and rear instructions are omitted.

FIG. 36(*a*) shows the case wherein the adding instruction (ADD:Q) and subtracting instruction (SUB:Q) of Q-format are in series. The destination operand is on the register in both cases. In this case, they are both the two-byte instruction and the registers specified as the destination operand are different, so that two instructions can be executed in parallel.

More concretely, as shown in FIG. 37(*a*), two instructions are processed simultaneously in each pipeline stage as one step code. Adding processing is executed in the ALU 53 and the subtracting processing in the sub ALU 59.

FIG. 36(*b*) shows the case wherein the moving instruction (MOV:G) of G-format and the adding instruction (ADD:Q) of Q-format are in series.

Both the source operand and destination operand of the MOV instruction are on the memory. In this case, the second step code of the MOV instruction and the ADD instruction can be executed in parallel.

More concretely, as shown in FIG. 37(*b*), two instructions are processed simultaneously in each pipeline stage as one step code. Moving processing is executed in the ALU 53 and adding processing in the sub ALU 59. In this case, write-in processing of the destination operand of the MOV instruction on the memory is executed in the store buffer.

FIG. 36(*c*) shows the case wherein the multiplying instruction (MUL:R) of R-format and the adding instruction (ADD:Q) of Q-format are in series. In this case, they are both the two-bytes instructions, and since the register specified as the destination operand in the MUL instruction is not referred to by the ADD instruction, the two instructions can be executed in parallel.

More concretely, as shown in FIG. 37(*c*), two instructions are processed simultaneously in each pipeline stage as one step code. In the E stage 5, adding processing with respect to the ADD instruction is executed in the last step cycle of the MUL instruction.

FIG. 36(*d*) shows the case wherein the arithmetic shift instruction (SHA:Q) of Q-format and the subtracting instruction (SUB:L) of L-format are in series, and wherein as there is a conflict of the operand two instructions can not be executed in parallel. That is, in this case, though they are both the two-byte instructions, since the content of register RO rewritten by the SHA instruction is referred to by the SUB instruction, the two instructions can not be executed in parallel.

More concretely, as shown in FIG. 37(*d*), two instructions are processed in each pipeline stage each as one step code.

FIG. 36(*e*) shows the case wherein the adding instruction (ADD:Q) of Q-format and the moving instruction (MOV:G) of G-format are in series. Destination operands of the ADD instruction and MOV instruction are both on the memory. In this case, the ADD instruction and the first step code of the MOV instruction can be executed in parallel.

More specifically, as shown in FIG. 37(*e*), two instructions are processed simultaneously in each pipeline stage as one step code. Adding processing is executed in the ALU 53 and moving processing in the sub ALU 59. In the first step code of the MOV instruction, the source operand value of the MOV instruction is saved in a working register. Write-in processing of the destination operands of the ADD instruction and MOV instruction on the memory is executed in the store buffer.

FIG. 36(*f*) shows the case wherein the adding instruction (ADD:Q) of Q-format and the subtracting instruction (SUB:E) of E-format are in series. In this case, the ADD instruction and the first step code of the SUB instruction can be executed in parallel.

More concretely, as shown in FIG. 37(*f*), two instructions are processed simultaneously in each pipeline stage as one step code. The adding processing is executed in the ALU 53, and the moving processing in the sub ALU 59. In the first step of the SUB instruction, a literal value as the source operand of the SUB instruction is saved in a working register.

As described above, in the data processing system of the invention, a plurality of instructions are decoded simultaneously in the instruction decoding stage, and the hardware resource such as an arithmetic unit or the operand is checked for conflicts, and when plural instructions can be executed in parallel in the execution stage 5, the plural instructions are united to generate a step code as one pipeline processing unit and the step code is processed in the later pipeline stage. In this case, plural instructions are executed in parallel in the execution stage 5.
(5) "Another Embodiment of the Invention"

In the embodiment mentioned above, though the configuration is more or less complicated since the operation instructions between register-register and literal-register can be generated as the subcode, it is possible to realize parallel execution by the simpler configuration when only the first step code of the G-format on E-format instruction is generated as the subcode.

In the aforesaid embodiment, though three exclusive buses of SA bus 109, SB bus 110 and D bus 111 are used to connect between the sub ALU 59, the register file 52 and the SP calculation unit 49, since only the first operand is saved in the first step code of the G-format or E-format instruction, a moving path such as the latch coupled to the SA bus 109 and working register may just be provided, or the exclusive latch for saving the source operand may be provided such that the content of the saving latch can be referred to when processing the second step code.

Also, in the embodiment aforementioned, since the operand is specified by the immediate value in the instruction code when only the first step code of the E-format instruction is generated as the subcode, the function for checking the operand for conflicts is not necessary.

Furthermore, when the instruction 2 is the G-format instruction and the content of register specified as the first operand is rewritten by the instruction 1, if the calculation result is written in the register specified as the fist operand of the instruction 2 from the D0 bus 108 as well as in the working register at execution of the instruction 1, the conflict of the operand is not necessary to be checked even for the G-format instruction. Also, in this case, even when the instruction 1 starts to trap it is possible to reexecute from the instruction 2, thus even though the instruction 1 is likely to start trapping the subcode can be produced.

In the embodiment aforementioned, though the instruction 2 may be generated as the subcode only when it has no memory operand, when the instruction 1 has no memory operand the instruction 2 may have one or the extended portion. However, in this case, two decoders for decoding the addressing mode are required. When the operand of the instruction 2 is on the memory, though there is possibility of detecting EIT with respect to the bus access even by the instruction 2, when EIT is detected by the instruction 2, a PC value must be corrected to obtain the instruction address which starts the EIT. Even when each of the instructions 1 and 2 has the memory operand, it can be dealt with provided there are two address adders, but control will become very complicated.

In the aforesaid embodiment, though the sub ALU 59 is provided besides the main ALU 53 and the register file 52 and the SP calculation unit 49 are coupled by each different bus to execute two instructions in parallel, data transfer between the register file 52 or SP calculation unit 49 and the ALU 53, and the data transfer between the register file 52 or SP calculation unit 49 and the sub ALU 59 may be time shared using the same bus and shifting the calculation timing of the ALU 53 and the sub ALU 59.

In the embodiment described above, though the sub ALU 59 is provided besides the main ALU 53 to execute the two instructions in parallel, the shift instruction or bit search instruction may be executed in parallel with the other instruction by providing a sub-barrel shifter, sub-priority encoder etc.

Also, in the above mentioned embodiment, though three exclusive buses of SA bus 109, SB bus 110 and D bus 111 are used to connect between the sub ALU 59, register file 52 and SP calculation unit 49, the SB bus 110 is not required when the instruction capable of generating the subcode is limited to the moving instruction, one operand instruction and two-operand instruction between literal-register. When generating only the moving instruction as the subcode in processing an instruction set which does not update PSW by the moving instruction, a moving path such as a latch coupled to the SA bus 109 and the D bus 111 may just be provided in place of the sub ALU 59.

In the embodiment, though the main code is executed and controlled by the microinstruction, and the subcode is subjected to hardwired decoding for execution and control, both may be controlled by the microinstruction or subjected to hardwired control.

In the embodiment, though the instruction 1 is processed by a main data arithmetic unit and the instruction 2 is processed by the sub ALU 59, for example, when the instruction 1 is the ALU calculation instruction between register-register, and the instruction 2 is the shift instruction of the operand on the register, the instruction 2 may be processed by a barrel shifter 59 and the instruction 1 by the sub ALU 59.

In the embodiment, though two instructions cannot be executed in parallel when the instruction 1 has extend data, when the sub decoder 32 is provided in plural, the two instructions can be executed in parallel even when the main decoder includes the extended portion such as displacement.

In the embodiment, though the two instructions can be executed in parallel, three or more instructions can be naturally executed in parallel.

In the embodiment, though a variable length instruction set is to be processed, it may be applied in a data processing system which processes a fixed length instruction set such as an RISC (Reduced Instruction Set Computer). In the RISC, basically calculations are executed between the registers, so that the invention may be applied more effectively.

As particularly described theretofore, according to the invention, when instruction decoding means decodes an instruction group constituted by plural instructions simultaneously, the operand value referred to by respective instructions is not rewritten by the respective preceding instructions, and each instruction can be executed by different arithmetic units provided in instruction executing means, the instruction executing unit executes plural instructions in parallel, so that the processing speed is improved and exceptional processings can be executed accurately without adding the specific function.

According to the data processing system of the invention, since the instruction decoding means is capable of decoding a last decoding unit related to the first instruction and a first decoding unit related to the second instruction succeeding the first instruction simultaneously, and the instruction executing means is capable of executing the instruction corresponding to the decoded result of a last decoding object related to the first instruction, and the instruction corresponding to the decoded result of the first decoding unit related to the second instruction in parallel, the processing speed is improved and the data processing system having a high performance can be realized.

Furthermore, according to the data processing system of the invention, since the instructions can be selected so as to be executed sequentially, disorder at debug and test can be prevented.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data processor for executing preceding and following instructions in parallel, comprising:

instruction fetch means for fetching instruction data from a storage means and for outputting instruction data of said preceding and said following instructions simultaneously;

instruction decoding means, coupled to said instruction fetch means to receive the instruction data of both said preceding and said following instructions in parallel, for decoding said preceding and following instructions in parallel, said instruction decoding means comprising:

first decoding means for decoding the instruction data of said preceding instruction transferred from said instruction fetch means and for issuing a first decoded result; and second decoding means for decoding the instruction data of said following instruction transferred from said instruction fetch means and for issuing a second decoded result;

instruction execution means, coupled to said instruction decoding means to concurrently receive both said first and said second decoded results, for executing said preceding and said following instructions in parallel in accordance with said first and said second decoded results issued from said instruction decoding means;

detecting means for detecting all exception that results from processing said preceding instruction before completion of instruction processing when one or a plurality of exceptions are detected at execution of said preceding instruction and where the exception requires reexecution of the instruction processing; and control means, coupled to said instruction execution means and said detecting means, for preventing said instruction execution means from executing both preceding and following instructions when said exception is detected; wherein said instruction execution means performs an exceptional processing before completion of execution of said preceding instruction.

2. A data processor for executing preceding and following instructions in parallel, comprising:

instruction fetch means for fetching instruction data from a storage means and for outputting instruction data of said preceding and said following instructions simultaneously;

instruction decoding means, coupled to said instruction fetch means to receive the instruction data of both said preceding and said following instructions in parallel, for decoding the instruction data of both said preceding and said following instruction in parallel and for concurrently issuing a first decoded result decoded from the instruction data of said preceding instruction and a second decoded result decoded from the instruction data of said following instructions:

instruction execution means, coupled to said instruction decoding means to concurrently receive both said first and said second decoded results, for executing said preceding and said following instructions in parallel in accordance with said first and said second decoded results issued from said instruction decoding means;

detecting means for detecting an external interruption; and control means, coupled to said instruction execution means and said detecting means, for controlling instruction execution sequence in said instruction execution means, said control means for controlling said instruction execution means to accept the external interruption before the execution of said preceding instruction or after the execution of said following instruction, when said detecting means detects the external interruption and said first and second decoded results are issued from said instruction decoding means in parallel.

3. A data processor for executing preceding and following instructions in parallel, comprising:

instruction fetch means for fetching instruction data from a storage means and for outputting instruction data of said preceding and said following instructions simultaneously;

instruction decoding means, coupled to said instruction fetch means to receive the instruction data of both said preceding and said following instructions in parallel, for decoding said preceding and following instructions in parallel, said decoding means comprising:

first decoding means for decoding the instruction data of said preceding instruction transferred from said instruction fetch means, for issuing first decoded result and for outputting suppressing information indicating that parallel execution of said following instruction with said preceding instruction is prohibited, said first decoding means generating said suppressing information when said preceding instruction is a predetermined instruction having a possibility of causing a trap, second decoding means for decoding the instruction data of said following instruction transferred from said instruction fetch means and for issuing a second decoded result, and a validity judgment circuit, coupled to said first decoding means to receive said suppressing information, for preventing said second decoding means from issuing said second decoded result when said suppressing information is generated; and instruction execution means, coupled to said instruction decoding means to receive said first and second decoded results, for executing said preceding instruction in accordance with said first decoded result, said instruction execution means executing said following instruction in parallel with said preceding instruction in accordance with said second decoded result when said instruction execution means receives said second decoded result concurrently with said first decoded result, wherein when said trap occurs during processing of said preceding instruction, said instruction execution means executes an exceptional processing after completion of execution of said preceding instruction.

* * * * *